US012585701B2

(12) United States Patent
Kim

(10) Patent No.: US 12,585,701 B2
(45) Date of Patent: Mar. 24, 2026

(54) IDEATION PLATFORM DEVICE AND METHOD USING DIAGRAM

(71) Applicant: HOMO MIMICUS CO., LTD, Daejeon (KR)

(72) Inventor: Sun Joong Kim, Daejeon (KR)

(73) Assignee: HOMO MIMICUS CO., LTD, Daejeon (KR)

( * ) Notice: Subject to any disclaimer, the term of this patent is extended or adjusted under 35 U.S.C. 154(b) by 821 days.

(21) Appl. No.: 17/635,259

(22) PCT Filed: Aug. 14, 2020

(86) PCT No.: PCT/KR2020/010833
§ 371 (c)(1),
(2) Date: Feb. 14, 2022

(87) PCT Pub. No.: WO2021/029726
PCT Pub. Date: Feb. 18, 2021

(65) Prior Publication Data
US 2022/0292367 A1     Sep. 15, 2022

(30) Foreign Application Priority Data
Aug. 14, 2019     (KR) ........................ 10-2019-0099473

(51) Int. Cl.
*G06F 16/901*          (2019.01)
*G06F 16/903*          (2019.01)
(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS

2008/0114710 A1 * 5/2008 Pucher ................... G06N 20/00
                                                                            706/20

FOREIGN PATENT DOCUMENTS

KR     10-2003-0092671 A     12/2003
KR     10-2006-0054977 A      5/2006
KR     10-2011-0136843 A     12/2011
(Continued)

OTHER PUBLICATIONS

Hatchuel et al., A New Approach of Innovative Design: An Intriduction To C-K Theory, International Conference On Engineering Design, ICED 03 Stockholm, Aug. 21, 2003.
(Continued)

*Primary Examiner* — Scott A. Waldron
(74) *Attorney, Agent, or Firm* — IP&T GROUP LLP

(57) ABSTRACT

An ideation platform device and method using a diagram are disclosed. An ideation platform device using a diagram, according to one embodiment of the present invention, can comprise: a C-K canvas module for providing a C-K canvas divided into a concept space and a knowledge space and connecting a concept and knowledge to each other on the C-K canvas through a chaining process so as to help a solution search for resolving a problem; and an instance management module for storing and managing, as one instance, the C-K canvas, for which a solution search is completed, including the concept, the knowledge, and information about an interconnection relationship.

6 Claims, 25 Drawing Sheets

(56)  References Cited

FOREIGN PATENT DOCUMENTS

| | | | |
|---|---|---|---|
| KR | 10-2012-0071966 A | 7/2012 | |
| KR | 10-2019-0086395 A | 7/2019 | |

OTHER PUBLICATIONS

Akin Osman Kazakci, CKE theory as a theorical foundation for design assistants : DesigNAR, a concept synthesis assistant based on CKE theory, Sep. 25, 2007, pp. 1-253.

Ozgur Eris, Insisting on Truth at the Expense of Conceptualization: Can Engineering Portfolios Help?, International Journal of Engineering Education, Jan. 2006, pp. 551-559, vol. 22, No. 3, 2006 TEMPUS Publications.

Le Masson Pascal et., Design Theory and Collective Creativity: a Theoretical Framework To Evaluate KCP Process, International Conference On Engineering Design, ICED'09, Aug. 24-27, 2009, pp. 6-277-6-288, Stanford University, Stanford, CA, USA.

Extended European Search Report for European Patent Application No. 20852572.5 issued by the European Patent Office on Jul. 17, 2023.

PCT Publication and International Search Report for International Application No. PCT/KR2020/010833 issued by the International Searching Authority (Korean Intellectual Property Office) on Feb. 18, 2021.

* cited by examiner

FIG. 2

Conceptualiztion

C ←——————— K

Concept Expansion ↓                    ↑ Knowledge Expansion

C ——————→ K

Concept Activation

Case search by using similarity assessment    ~S400

Contextual search of case selected by user (analysis relation index)    ~S405

Update of the relation indicator's influence    ~S410

| | 1st biological system information | 2nd biological system information | 3rd biological system information | ••• | nth biological system information |
|---|---|---|---|---|---|
| Corpus data set | Similarity index assessment value | Similarity index assessment value | Similarity index assessment value | | Similarity index assessment value |

(b)

| | 1st biological system information | 2nd biological system information | 3rd biological system information | ••• | nth biological system information |
|---|---|---|---|---|---|
| Biological word | Similarity index assessment value | Similarity index assessment value | Similarity index assessment value | | Similarity index assessment value |

FIG. 13

IDEATION PLATFORM DEVICE AND METHOD USING DIAGRAM

This application is a national stage application of PCT/KR2020/010833 filed on Aug. 14, 2020, which claims priority of Korean patent application number 10-2019-0099473 filed on Aug. 14, 2019. The disclosure of each of the foregoing applications is incorporated herein by reference in its entirety.

FIELD

The present invention relates to an ideation platform apparatus and a method using diagram.

BACKGROUND

With the development of artificial intelligence and machine learning technologies, expectations for the implementation and commercialization of expert systems with a vast knowledge base are also increasing. For example, an artificial intelligence-based expert system that finds candidate compounds that can be used in the development of new drugs is being implemented in the form of actual services such as 'Watson' in the US and 'Standigm' in Korea. This expert system operates on a knowledge base such as a database of compounds and a database of disease-compound interaction relationships. The user of the expert system inputs an appropriate query in the form of 'sentence' and 'keyword (target disease)', and the expert system generates and verifies candidate compounds that can be used to solve the target disease and provide them to users. The search fee is quite expensive, so that the cheapest system charges USD 20,000 per search for one target disease. Nevertheless, because it can significantly reduce the astronomical budget spent on new drug development, numerous domestic and foreign pharmaceutical companies have already introduced or are planning to introduce the relevant expert systems.

The expert system operates on a specialized knowledge base, which generally has a multi-dimensional data structure. In the case of the expert system for deriving candidate compounds for the new drug development, it has a multi-dimensional data layers such as <disease data>-<drug efficacy data>-<toxicity relation data>-<compound data>-<living entity data>-<protein data>. In the case of a conventional search method, which unilaterally commands to find a candidate compound that is likely to be effective for a target disease, a simple query in the form of a keyword may be appropriate because the search rule is already strongly organized. However, in order to implement an expert system that can respond to multiple search situations, such as when complex considerations are required, for example, 'search for a biological entity equipped with an enzyme having a specific medicinal effect', in search situation in which search rules must be newly combined according to the context, it is difficult for the user to construct a query that reflects the context into a sentence. In addition, even the expert system that analyzes the syntax of a query cannot exclude the ambiguity of a query composed in the form of a sentence. Therefore, it is inevitably difficult to secure the accuracy of the search results.

Rather, if the multidimensional data structure is directly reflected in the query and a plurality of queries for each dimension are separately written and searched, the expert systems can respond to multiple search situations and greatly relieve users' trouble to decorate complex contexts in sentences or expert search. For this reason, it is possible to greatly solve the adverse effect of the ambiguity of the sentence-type query on search accuracy Therefore, it is necessary to construct a diagrammed query so that the system can understand users' complex 'problem-solving (design)' context.

Korean Patent Publication No. 10-2006-0054977 discloses a method for establishing a knowledge base of an expert system, an apparatus suitable therefor, and a recording medium.

SUMMARY

Technical Objectives

An object of the present invention is to provide an ideation platform apparatus and method using a diagram that diagrammatically defines a complex problem-solving context, and helps to find and apply a solution required for problem-solving within the diagram.

The present invention is to provide an ideation platform apparatus and method using a diagram that helps in solution search by allocating conceptual space and knowledge space to develop a solution using the mutual overlap of concepts and knowledge, and diagramming the problem-solving process through a chaining process that connects concepts and knowledge.

Objects other than the present invention will be easily understood through the following description.

Technical Solutions

According to one aspect of the present invention, there is provided a diagram-based ideation platform apparatus including a C-K canvas module configured for providing a C-K canvas divided into a concept space and a knowledge space, and connecting concepts and knowledge on the C-K canvas through a chaining process to help a solutions search for problem solving and a case management module configured for storing and managing the C-K canvas in which the solution search including the concept, the knowledge, and information on the interconnection relationship is completed as one case.

The C-K canvas module may include a canvas management unit configured for managing the C-K canvas, a card management unit configured for converting the concept and the knowledge into a card and for registering, editing, and deleting, an associated card search unit configured for searching for and recommending an associated card related to a first card registered on the C-K canvas through a knowledge-based system and a link connection unit configured for connecting a link between the first card and the associated card selected among the recommended associated cards.

A concept card in which the concept is converted into a card may be placed in the concept space and a knowledge card in which the knowledge is converted into a card may be placed in the knowledge space, and a connection of the link may be automatically established but modifiable by a user.

The elements that can be registered as the concept card may be at least any one of ten elements of a causal model used in the knowledge-based system. The ten elements of the causal model may include CoS (Change of State), PPH (Physical Phenomena), PEF (Physical Effects), Input, EPH (Ecological Phenomena), EBH (Ecological Behavior), Organ, Part, Entity, and Action.

The associated card search unit may search for a past case suitable for the first card by using case reuse, and extract other concepts and knowledge similar to the concept described in the first card from a causal model included in the past case to recommend as the associated card.

The associated card search unit may be configured for searching for the past cases through similarity assessment, analyzing a relation index for the past case selected by the user through contextual search, and updating an influence of the relation index.

Alternatively, the associated card search unit may be configured for performing a similarity assessment by comparing a first entity value of entities of the knowledge-based system with a second entity value of entities of the C-K canvas, mapping connections of entities to be added to the C-K canvas from causalities between entities of the knowledge-based system, determining a placement priority of the associated cards by reflecting the influence of the indices used in the similarity assessment in the highest order, and updating a most contributing elements to reflect the user's final selection.

According to another aspect of the present invention, there is provided a C-K canvas including a concept space in which a concept card with a content related to a concept is placed in response to a user input and a knowledge space in which a knowledge card with a content related to a knowledge related to the concept is placed by a search or a recommendation, wherein a link indicating a relationship between the concept card and the knowledge card or between the concept card and another concept card is connected and visualized.

The concept card may be equipped with an additional button including at least one of a search button, an image addition button, a link creation button, a connected card view only button, and a card deletion button.

When the search button is selected, past cases with high similarity to the concept cards may be searched and listed from a knowledge-based system through case reuse and concept cards and knowledge cards included in the past cases may be added as associated cards to the current CK canvas.

The concept space may be a space in which a background knowledge about a problem to be solved by the user and various concepts related to the background knowledge are described, and the knowledge space may be a space in which an expertise about an actual mechanism that the user can use to implement the concepts developed by an idea is developed.

According to still another aspect of the present invention, there is provided a diagram-based ideation method being performed on a diagram-based ideation platform apparatus including executing a C-K canvas divided into a concept space and a case space, registering a concept card in the concept space when a user input is received on the C-K canvas, searching for an associated card through interworking with a knowledge-based system when a search request related to the concept card is input, listing the searched related cards and placing the selected associated cards in the concept space and the knowledge space according to attributes, and connecting and visualizing a link between the concept card and the associated card.

The searching for the associated card, the placing the selected associated cards, and the connecting the link may be are repeatedly performed, and the C-K canvas may be stored and managed as one case when the iteration is completed.

The searching for the associated card may search for, in the knowledge-based system, a case having a high similarity as a result of a similarity assessment among past cases through case reuse based on a search query reconstructed from the concept card, and extract and recommend concepts and knowledge to be recommended as the associated card based on the causal relationship described in the searched case.

Other aspects, features and advantages other than those described above will become apparent from the following drawings, claims, and detailed description of the invention.

Effects

According to embodiments of the present invention, it is advantageous in defining a complex problem-solving context diagrammatically, and helping to find and apply solutions required for problem-solving in the diagram.

In addition, it is also advantageous in helping in solution search by allocating conceptual space and knowledge space to develop a solution using the mutual overlap of concepts and knowledge, and diagramming the problem-solving process through a chaining process that connects concepts and knowledge.

BRIEF DESCRIPTION OF ACCOMPANYING DRAWINGS

Figure 2:
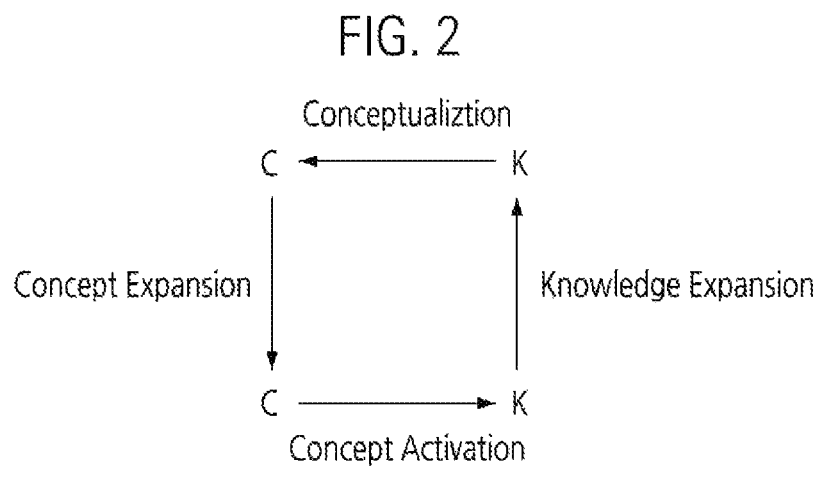

FIG. 2 is a creative expression process in C-K theory;

Figure 4:
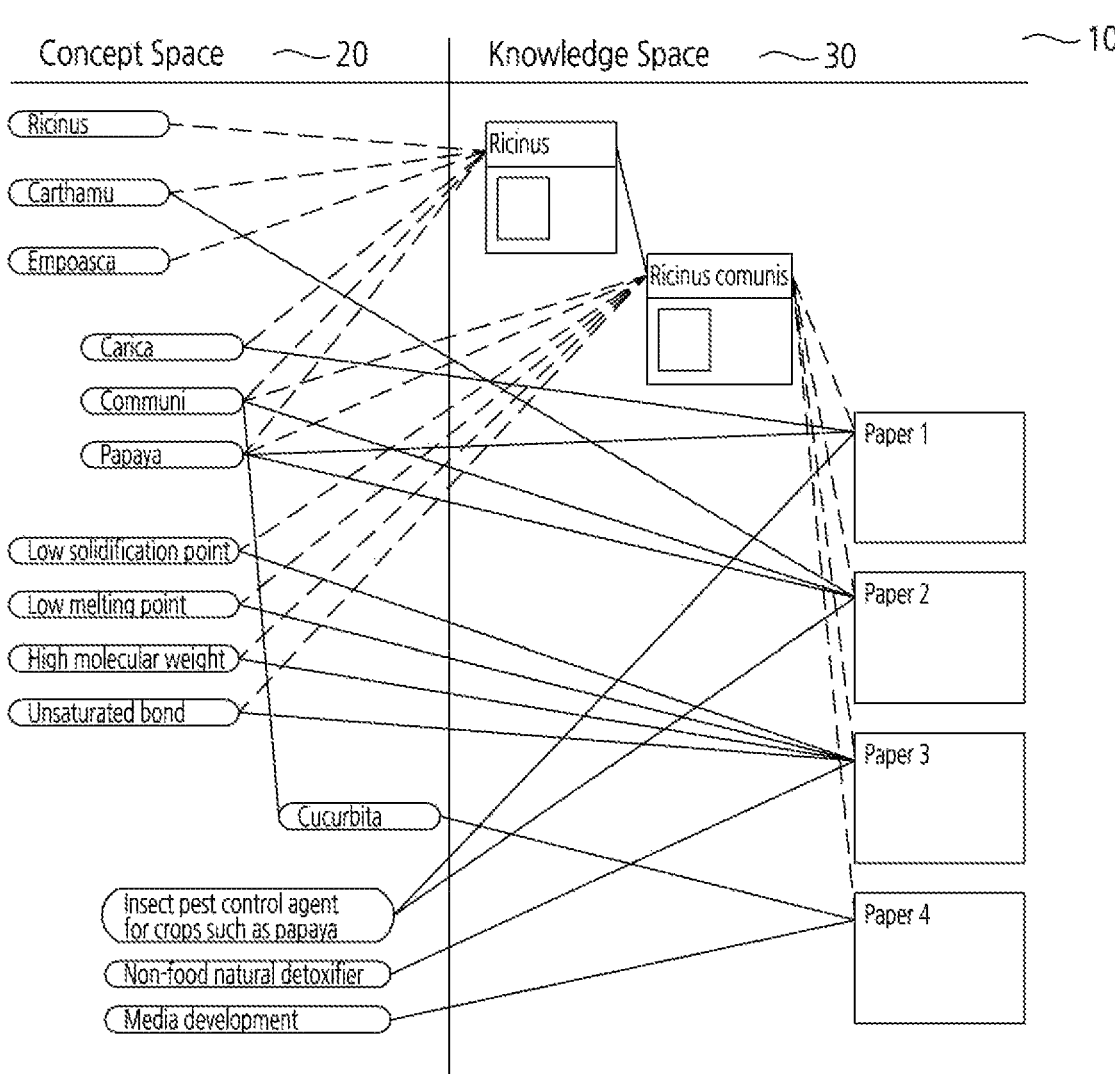
Figure 5:
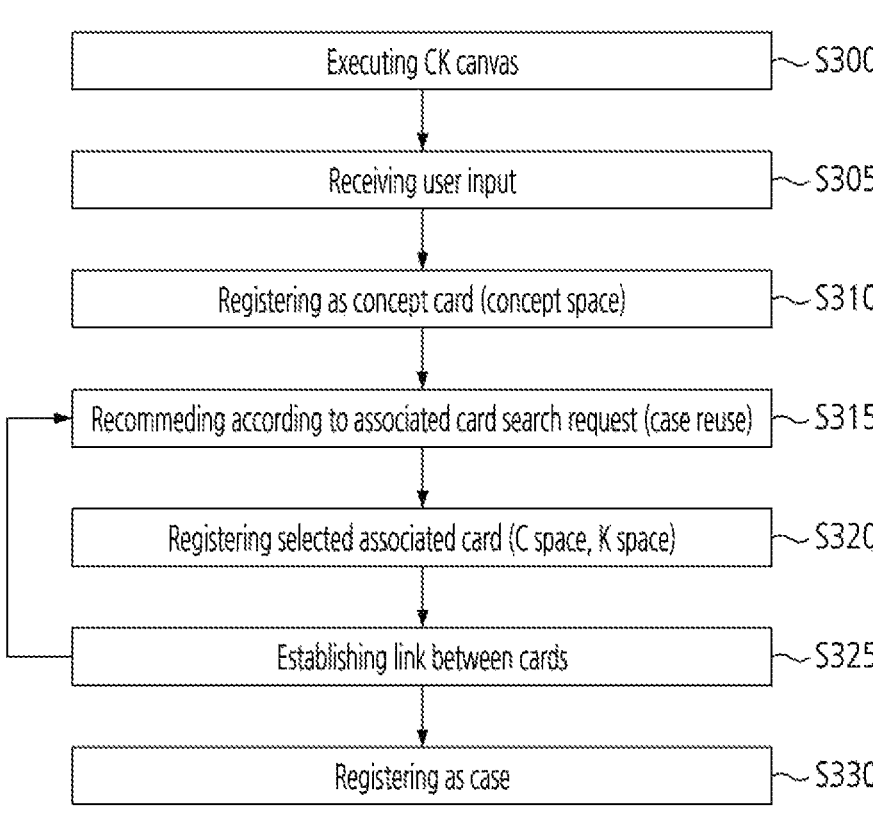
Figure 6:
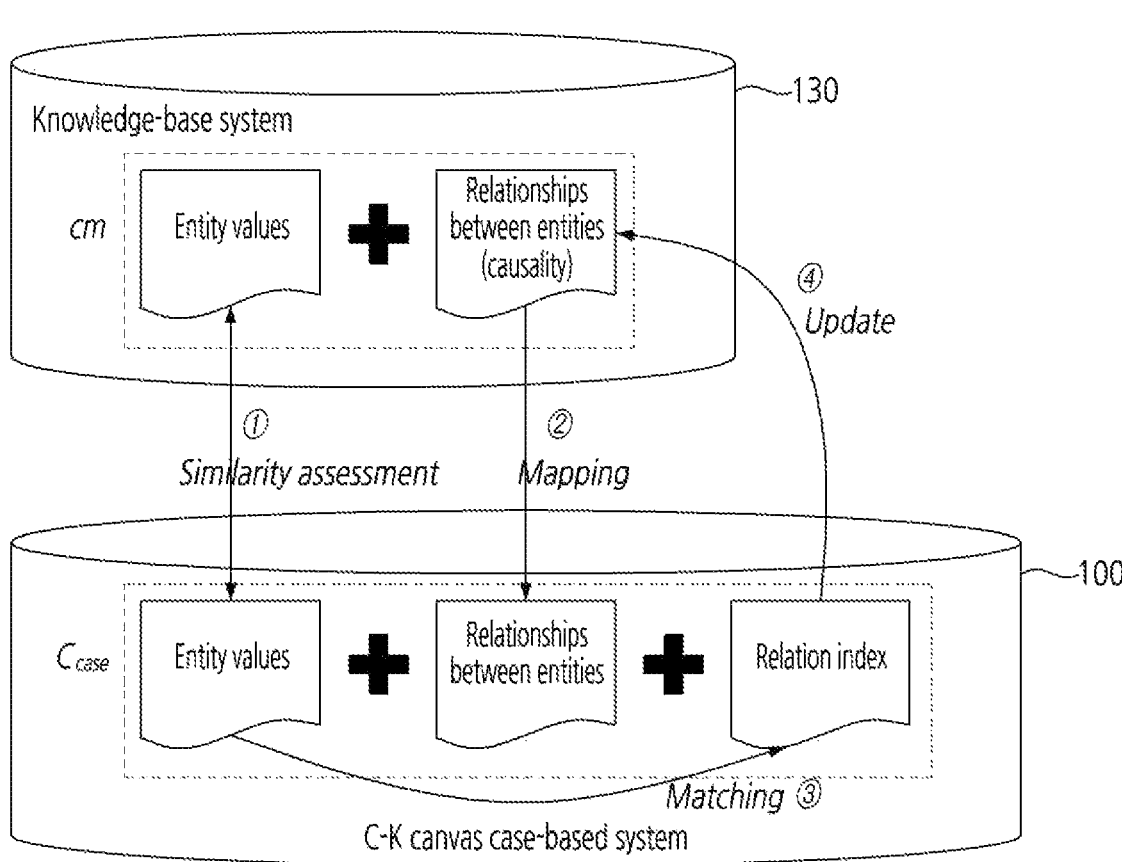
Figure 7:
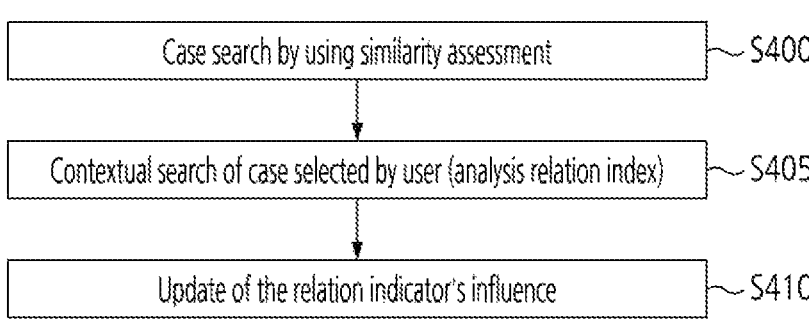
Figure 8:
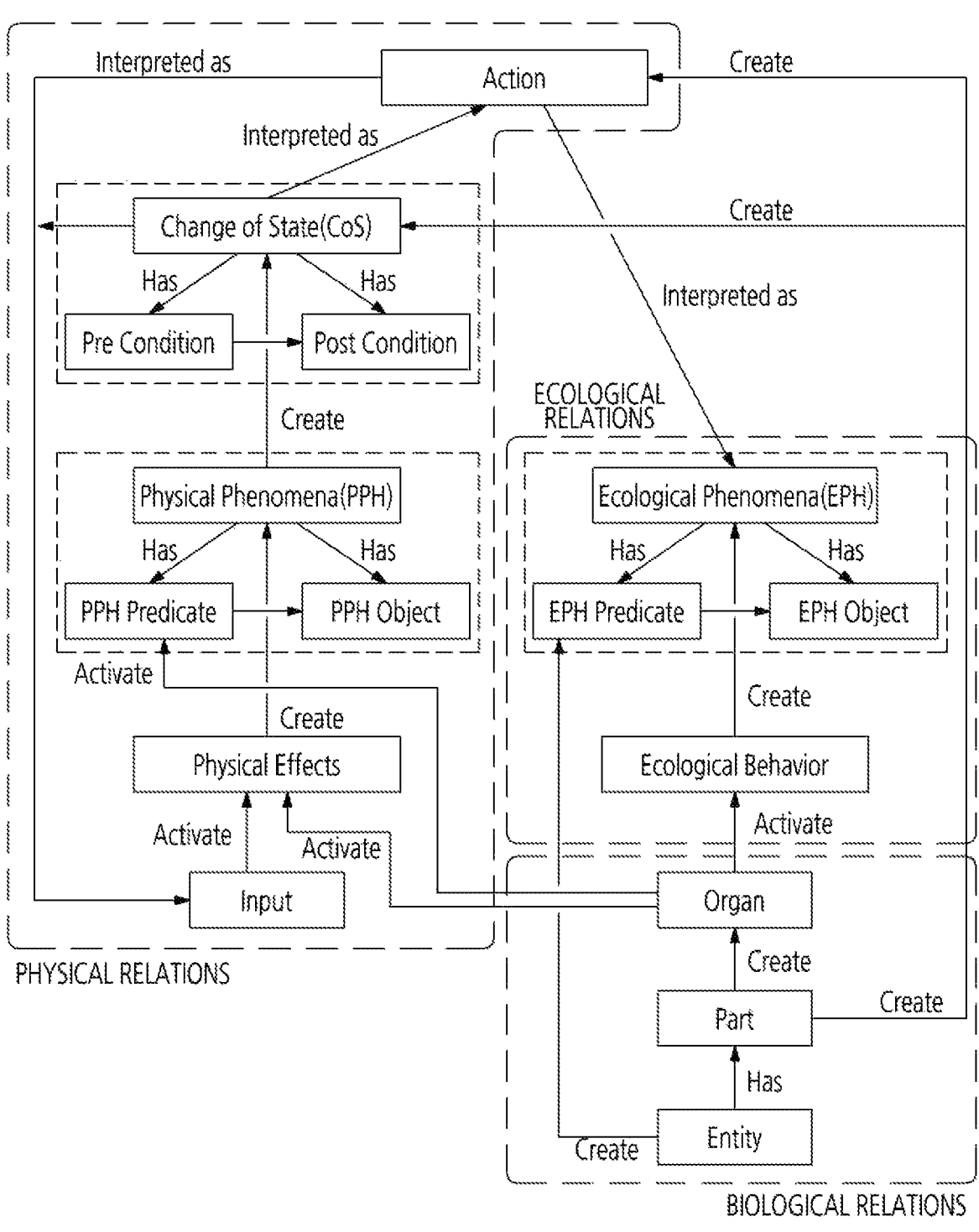
Figure 9:
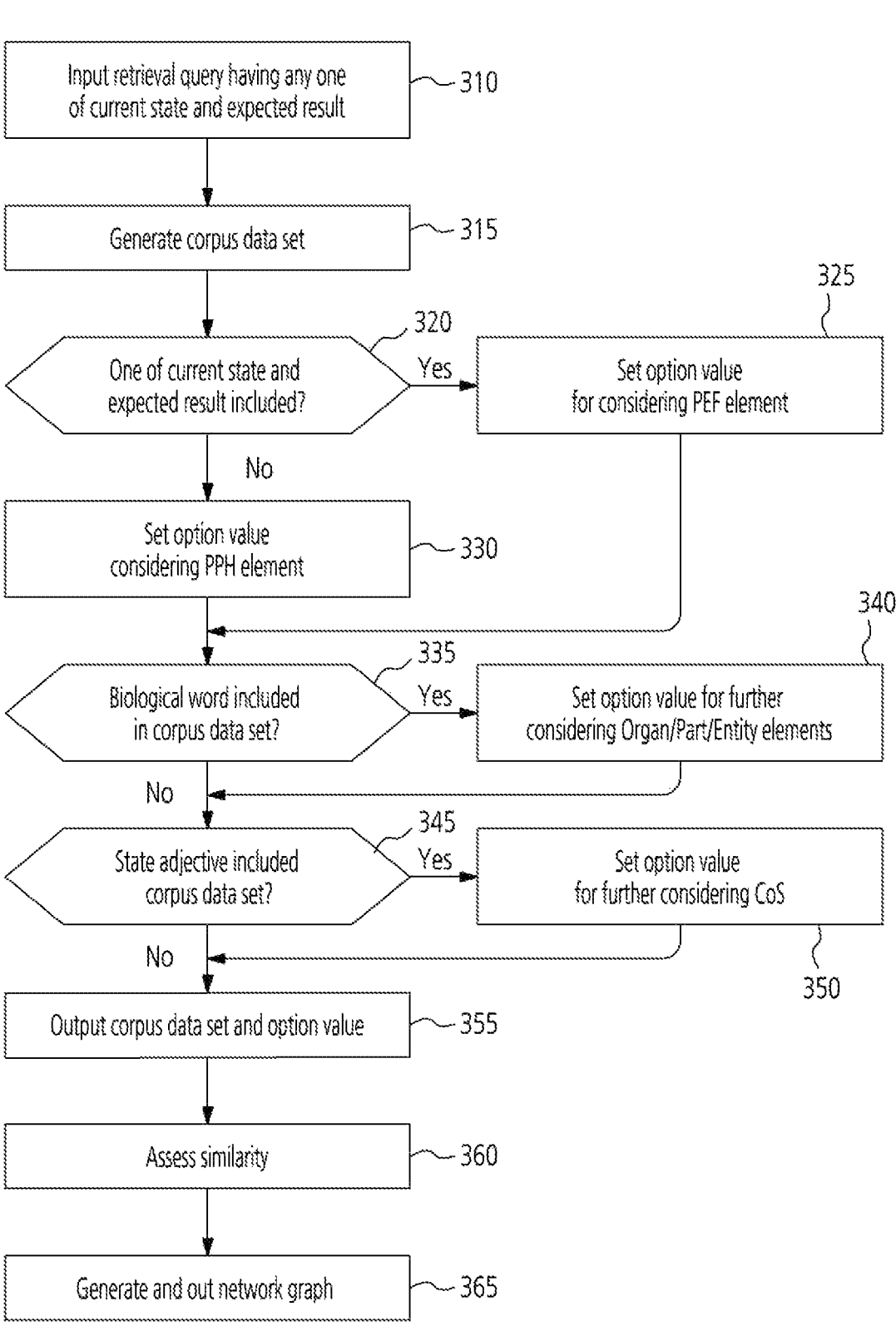
Figure 11:
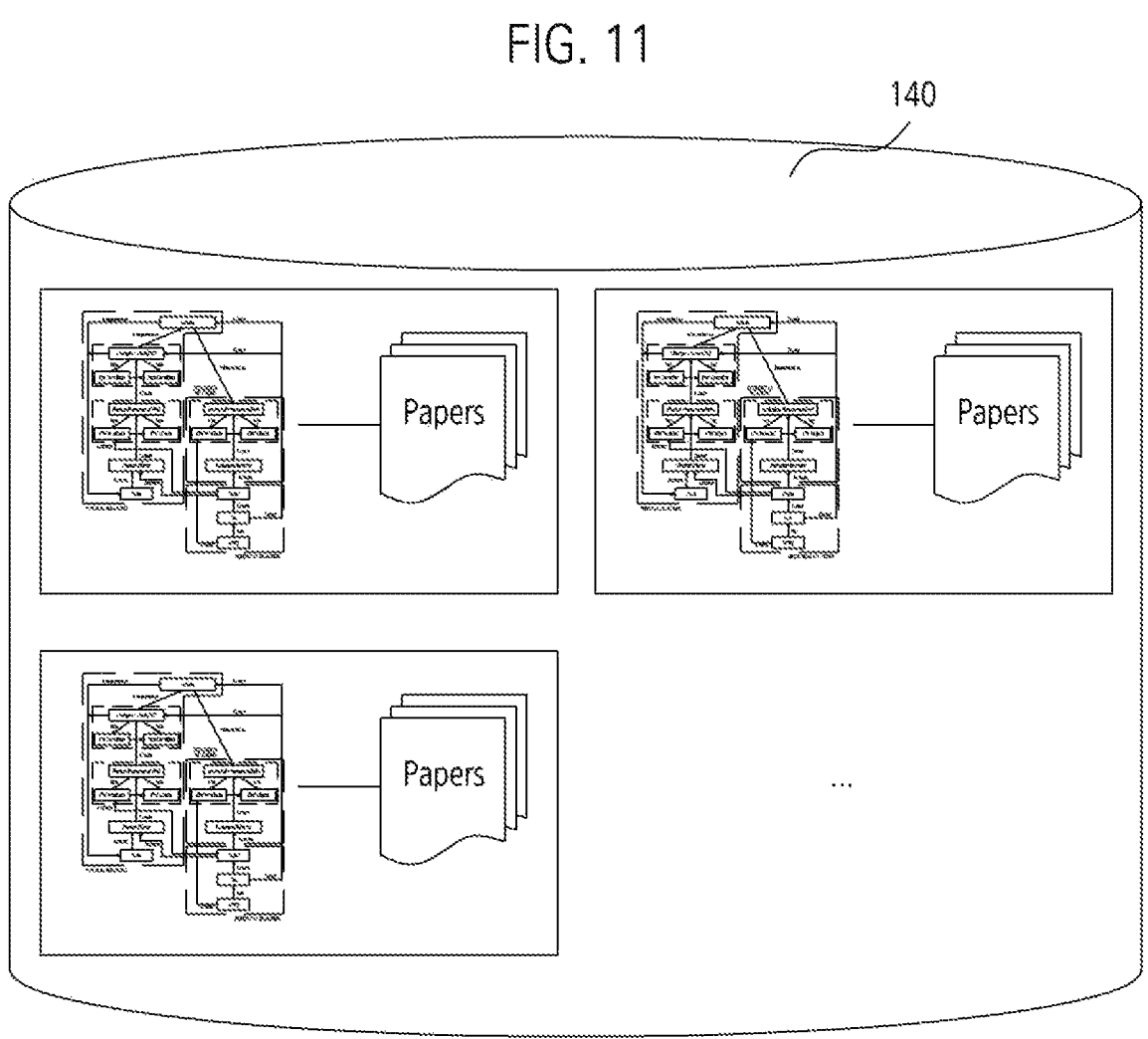

FIG. 4 exemplarily illustrates C-K canvas;

FIG. 5 is a flowchart of a diagram-based ideation method performed in a diagram-based ideation platform apparatus according to embodiment of the present invention;

FIG. 6 exemplarily illustrates a case reuse operation algorithm;

FIG. 7 is a flowchart of an influence update method using case reuse;

FIG. 8 illustrates an ontology structure based on a causality for constructing a biological system information search system as knowledge-based system;

FIG. 9 is a flowchart of reconfiguring a search query;

FIG. 10 exemplarily illustrates a similarity matrix and a sub-similarity matrix;

FIG. 11 exemplarily illustrates examples stored in case storage; and

FIGS. 12 to 25 are exemplary views of a screen of the C-K canvas.

DETAILED DESCRIPTION

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of one embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

Terms such as ~part, ~unit, ~module mean an element configured for performing a function or an operation. This can be implemented in hardware, software or combination thereof.

Figure 1:
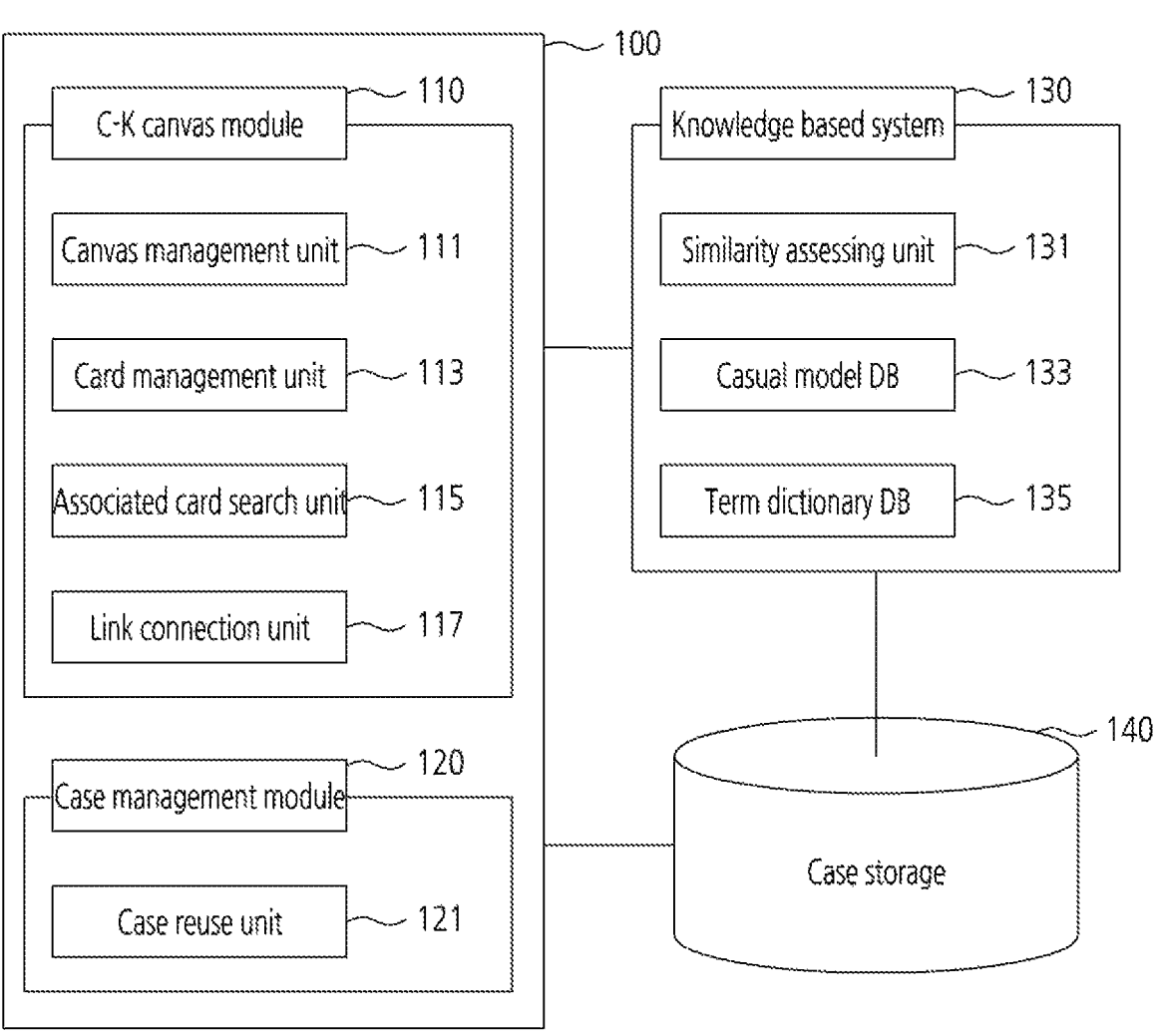
FIG. 1 is a schematic diagram of a diagram-based ideation platform apparatus according to one embodiment of the present invention.
Figure 3:
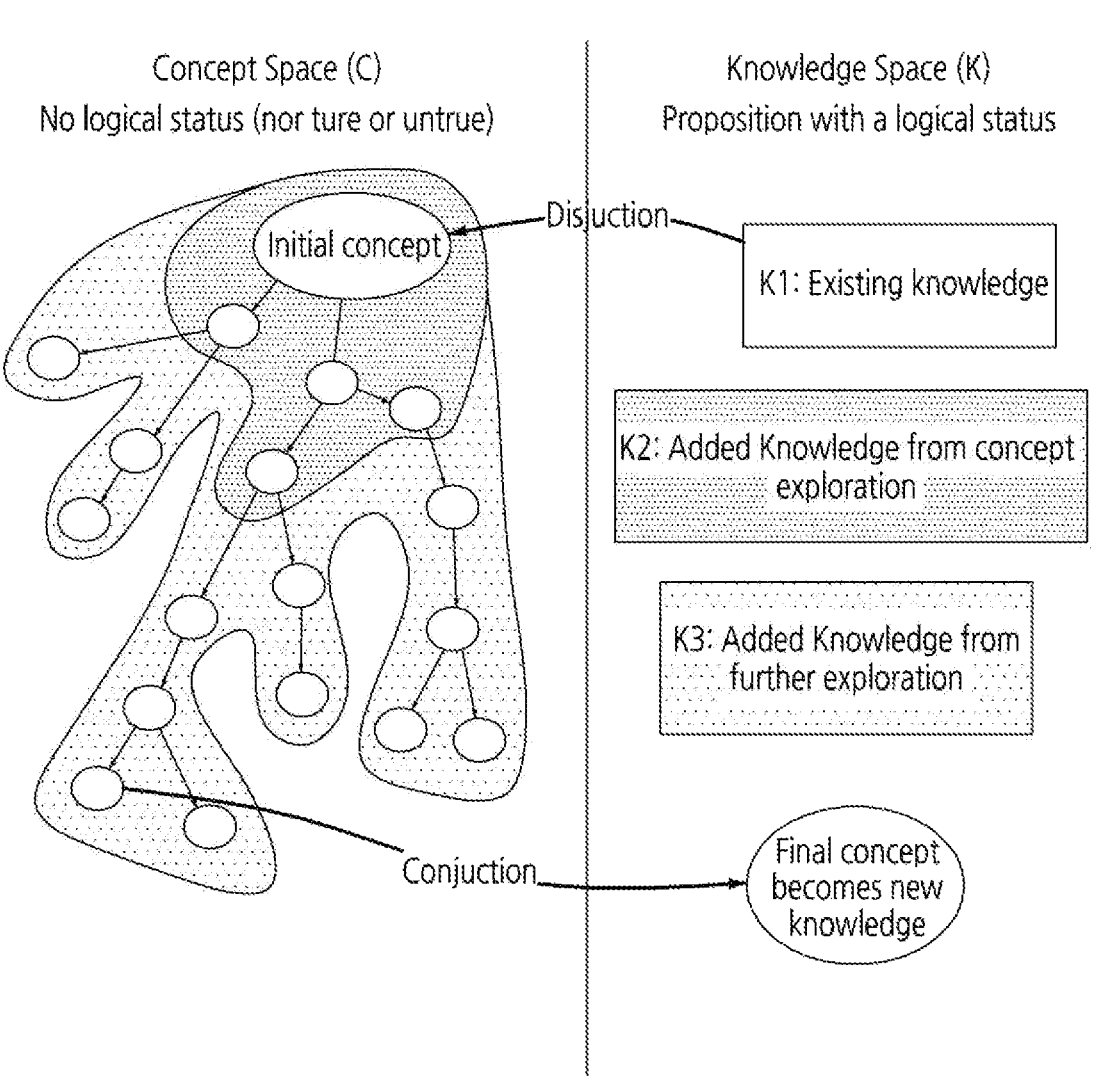
FIG. 3 is a diagram showing a method of organizing ideas in C-K canvas.

FIG. 1 is a schematic diagram of a diagram-based ideation platform apparatus according to one embodiment of the present invention, FIG. 2 is a creative expression process in C-K theory, FIG. 3 exemplarily illustrates a method of organizing ideas in C-K canvas, FIG. 4 exemplarily illustrates C-K canvas, FIG. 5 is a flowchart of a diagram-based ideation method performed in a diagram-based ideation platform apparatus according to embodiment of the present invention, FIG. 6 exemplarily illustrates a case reuse operation algorithm, FIG. 7 is a flowchart of an influence update method using case reuse, FIG. 8 illustrates an ontology structure based on a causality for constructing a biological system information search system as knowledge-based system, FIG. 9 is a flowchart of reconfiguring a search query, FIG. 10 exemplarily illustrates a similarity matrix and a sub-similarity matrix, FIG. 11 exemplarily illustrates examples stored in case storage, and FIGS. 12 to 25 are exemplary views of a screen of the C-K canvas.

The diagram-based ideation platform apparatus according to one embodiment of the present invention implements a C-K canvas that organizes and develops solution ideas for problem-solving by repeatedly deriving interconnections between concepts and knowledge that are divided into concept space and knowledge space.

C-K canvas is a tool that helps to find and apply solutions necessary for solving problem within the same diagram after defining complex problem-solving contexts by diagrammatically, and a thinking expansion tool developed from Concept-Knowledge theory. The C-K theory has the meaning of developing a solution using the mutual overlap of concept and knowledge.

The academic category of biomimetics encompasses not only technological development, but also the challenging study of human creativity expression research. From a cognitive psychology point of view, the process of solving human design problems from any one object or organism, that is, blue technology is an interesting research subject and has been treated as a core topic in the study of human creativity for a long time. The currently developed artificial intelligence algorithms could be implemented because of a base research that analyzed the thinking process of what kind of thing or creature humans were inspired by and simplified the algorithm into an algorithm.

Cognitive psychology researchers have discovered interesting common processes by analyzing patterns of what kind of objects or creatures humans have been inspired by. The process in which human solves problems can be simplified into a chaining process that connects certain concepts or knowledge with each other. Chains in which concepts and concepts, concepts and knowledge, and knowledge and knowledge are linked are entangled with each other and come up with new concepts that have not yet been conceived, and use unknown knowledge obtained from outside (external experts or literature resources, etc.) to solve the problem.

Referring to FIG. 2, the creativity expression process described in the C-K theory is shown. Another concept is derived from a specific concept through Concept Expansion, it is connected to specific knowledge through Concept Activation, and another knowledge is derived through Knowledge Expansion, and the knowledge is conceptualized is repeated, thereby expressing creativity and making it possible to develop solutions to solve problems.

This was a process that occurred internally in the human brain, and for creative collaboration between groups, it is necessary to record this internally occurring process and express it externally.

As a brainstorming tool designed for extrinsic expression, in this embodiment, the C-K canvas is used based on C-K theory to record time flow and thought development flow.

As described above, the C-K canvas is the tool based on the C-K theory, and it allows the chaining process between concepts and knowledge to be diagrammatically expressed. Accordingly, the user can visually check the individual's thought development process, and as an individual, he can receive visual feedback that can effectively and externally express his or her thinking development process.

FIG. 3 exemplarily illustrates a method of organizing ideas in C-K canvas.

By using the C-K canvas, it is possible to effectively communicate from the organizational point of view rather than using conventional brainstorming methods, and there is an opportunity for self-learning while receiving feedback from the individual point of view. In addition, it is advantageous that there is no need to separately record the thinking development process. In addition, it is advantageous that this record can be used again for the next problem-solving process.

In general, the majority of engineering designers have little knowledge of biology and ecology, which has long been pointed out as the root cause that prevents biomimetics from being established as a general design method. Engineering designers have had great difficulties in finding knowledge in nature suitable for solving or implementing concepts (generally, problem is function) expressed in their engineering vocabulary. For this reason, there is a need for a tool that can effectively organize appropriate knowledge.

The C-K canvas helps to visually express the process of deriving knowledge from concepts. Therefore, it is of great help in efficiently organizing knowledge on natural science in the process of technological development of biomimetics.

In one embodiment, the CK canvas 10 can be implemented in the diagram-based ideation platform apparatus 100 and it can be embedded in a knowledge-based system 130, and the searched knowledge can be directly edited in the CK canvas 10.

In order to diagram ideas on the C-K canvas using the C-K theory, it is necessary to re-analyze the analyzed issues, re-express them as related functional vocabulary, and classify them into concepts and knowledge. In other words, by allowing the user to freely visualize and connect queries and solutions on the C-K canvas, the completed diagram can ultimately become a resource for understanding users' query structure.

Users' responses in the C-K canvas can be regarded as cases, and these cases can be stored in a database, making it possible to make recommendations using this knowledge in a new user's project. In one embodiment, a recommendation system through case reuse may be designed to reuse cases only within the same organization (research organization or company).

Referring to FIG. 1, the diagram-based ideation platform apparatus 100 according to one embodiment includes a C-K canvas management module 110 and a case management module 120.

The CK canvas management module 110 implements the CK canvas 10 to visualize the idea in the concept space C and expertise in the knowledge space K, allowing designers (or user) to develop solutions by mutually overlapping concepts and knowledge according to the C-K theory.

Referring to FIG. 4, the C-K canvas 10 is largely divided into a concept space (space C) 20 and a knowledge space (space K) 30.

The concept space 20 is a space in which background knowledge about a problem to be solved by a designer and various concepts (e.g., sketches, various ideas, etc.) related thereto are written. In the concept space, keywords for ideas are continuously written as derivatives. Relationship lines (links, connecting lines) can be drawn to derived ideas.

The knowledge space 30 is a space in which a designer finds and describes an actual mechanism that can be used to implement concepts unfolded from the idea. Detailed explanations or system diagrams of various mechanisms discovered by the designer are inserted, and expertise suitable for implementing various concepts in the concept space can be developed.

Accordingly, various contents (this is referred to as a concept card) such as keywords, notes, or sketches can be freely inserted into the concept space 20, and contents of expertise such as papers, report extracts, or brief diagrams on physicochemical mechanisms (this is also referred to as a knowledge card) may be attached to the knowledge space 30.

Elements that can be registered as concept cards can be 10 elements (CoS (Change of State), PPH (Physical Phenomena), PEF (Physical Effects), Input, EPH (Ecological Phenomena), EBH (Ecological Behavior), Organ, Part, Entity, Action) of the causal model used in the knowledge-based system 130. This will be described later with reference to related drawings.

For example, if the concept of "photosynthesis" was derived during brainstorming and appeared in the concept space 20, in order to implement the concept of "photosynthesis" into an actual product, expertise on how the mechanism of "photosynthesis" is driven is needed. In this case, natural science knowledge (thesis or textbook text, etc.) on 'how plants generate energy through photosynthesis' or natural science papers such as 'strategy of plants to increase photosynthesis efficiency' can be searched and inserted to the knowledge space 30.

That is, if any one of the knowledge cards is linked to the concept card, this is the related expertise that should be referred to in implementing the concept card linked to the knowledge card as an actual function.

Card management unit 113 manages registration, editing, and deletion of concept cards and knowledge cards to be registered in the concept space 20 and the knowledge space 30.

Depending on the location where the user input is generated, if there is a user input related to card registration in the concept space 20, a concept card may be newly created, and if there is a user input related to card registration in the knowledge space 30, a knowledge card may be newly created and registered.

When there is a concept or knowledge derived from a specific concept card or knowledge card, associated card search unit 115 may search a associated card (concept card or knowledge card) related to the derived concept or knowledge in the knowledge-based system 130 and recommend. Case reuse may be applied in searching and recommending associated cards. The knowledge-based system 130 will be described later with reference to related drawings.

When the associated card to be related to a specific card at the moment is selected from among several associated cards searched by the associated card search unit 115, the associated card may be registered according to its properties as concept card and/or knowledge card in the concept space 20 and/or the knowledge space 30.

In this case, a link connection unit 117 may connect a link indicating that the newly registered associated card is derived from the specific card at the moment to visualize the relationship (connection relationship, derivation relationship) between the cards. For example, a link may be indicated by an arrow line. If card B is derived from card A, a link can be made from card A to B.

In design process (problem-solving process), a concept can develop from a "problem" to a specific "sketch" as follows.

Design Task→Problem Analysis or Problem Redefinition (Dichotomy)→Rough Ideas→Sketches Knowledge supports cards while they are being created and placed in conceptual space 20, and may be placed in knowledge space 30.

For example, if a text box "not get wet with water" is in the concept space as a concept card, then a designer can search a knowledge-based system for the knowledge that "lotus petals are super water-repellent so they don't get wet and drop water droplets" in nature, import this into the knowledge space 30 and register it as a knowledge card. An icon for search is provided on the card "not get wet with water", and when the icon is selected, a search window appears and the derived knowledge can be searched using the search algorithm of the knowledge-based system. When the user finally chooses to import the knowledge that "lotus petals are super water-repellent so they don't get wet and drop water droplets", this knowledge can be placed as a knowledge card in the knowledge space. Since the knowledge card "lotus petals are super water-repellent so they don't get wet and drop water droplets" is derived from the concept card "not get wet with water", it can be linked with an arrow line between the concept space and the knowledge space.

In one embodiment, the description format of the concept card and/or knowledge card may include text consisting of summarized sentences such as physical phenomenon elements, related keywords recommended in knowledge-based system, sketches sketched by designers, a paper card with information such as summaries and authors of papers searched from knowledge-based systems, and so on.

The content of the concept card and the knowledge card placed in the concept space and the knowledge space may be edited by the card management unit 113. The search result may be registered as it is, but the card contents may be modified and registered by the current designer. In this case, photos can be searched and registered to a card made of text only, or a sketch drawn by a designer by running a simple sketch program can be inserted.

Canvas management unit 111 manages the C-K canvas 10 implemented as a screen as shown in FIGS. 12 to 25.

Figure 12:
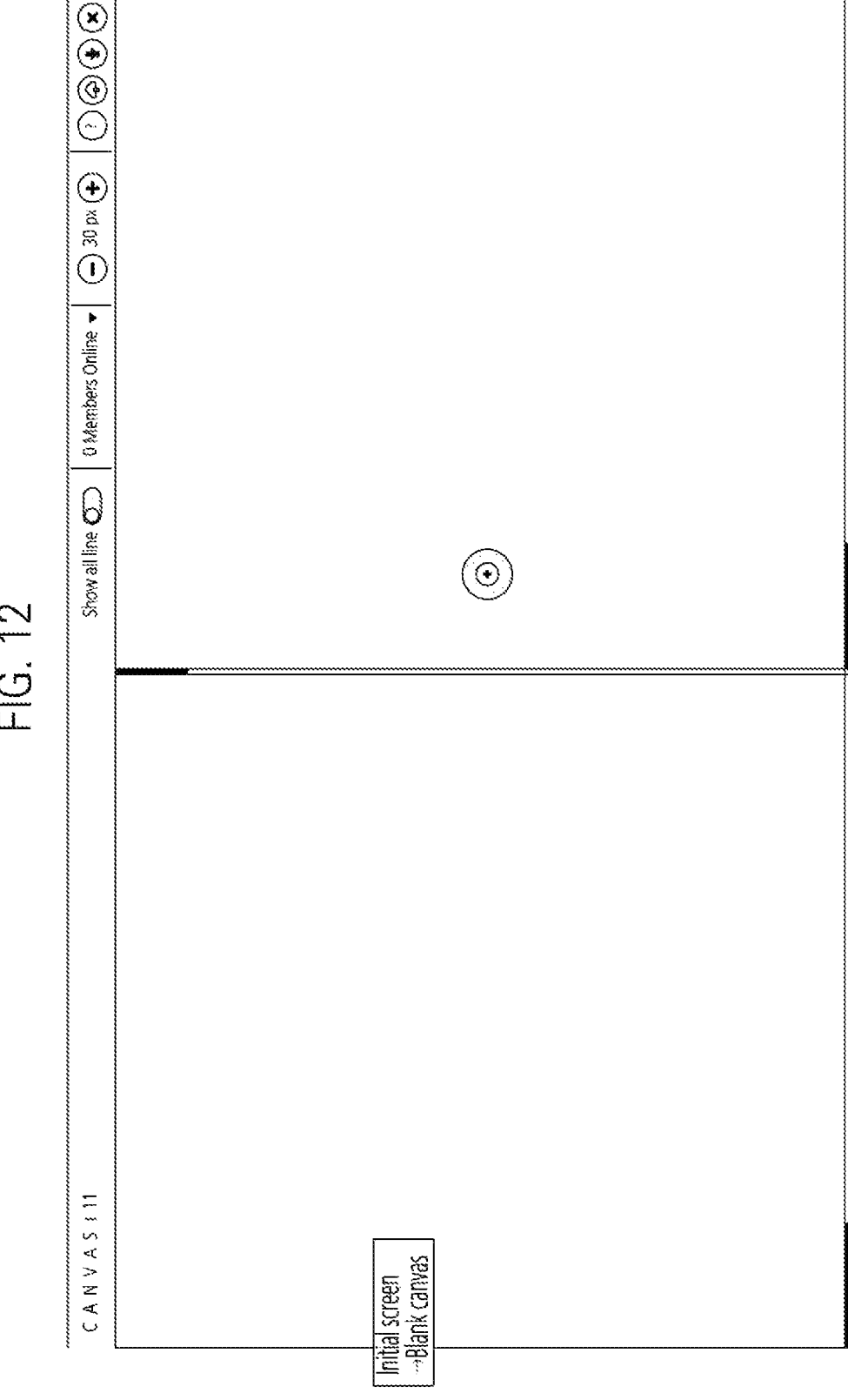

FIG. 12 shows an initial screen of the C-K canvas 10, that is, a blank canvas. The left may be set as the concept space, and the right may be set as the knowledge space.

Figure 13:
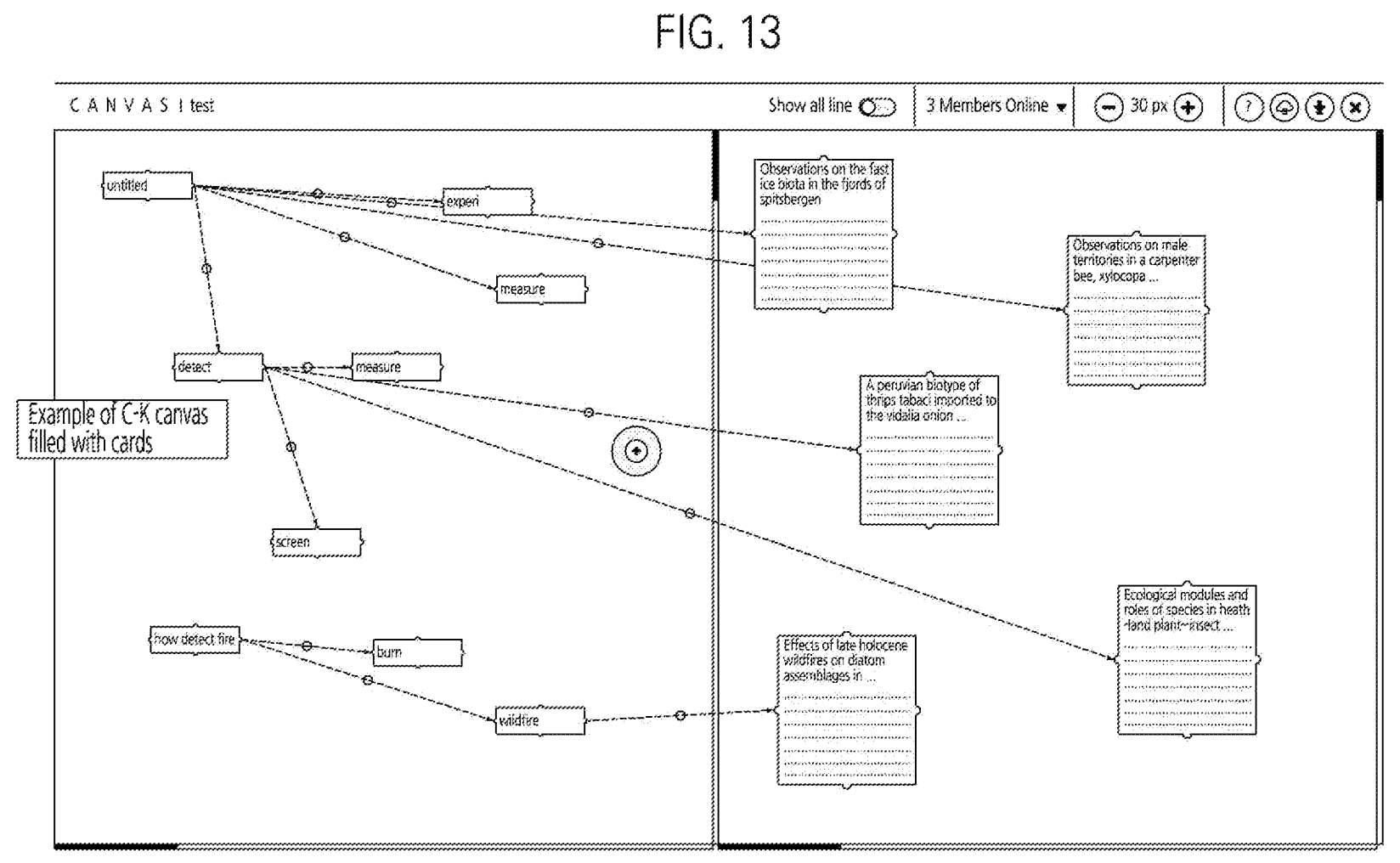

FIG. 13 shows an example of a canvas filled with concept cards and knowledge cards. The concept cards are placed in the concept space, the knowledge cards are placed in the knowledge space, and links are connected between the concept card and the knowledge card or between the concept cards.

Figure 14:
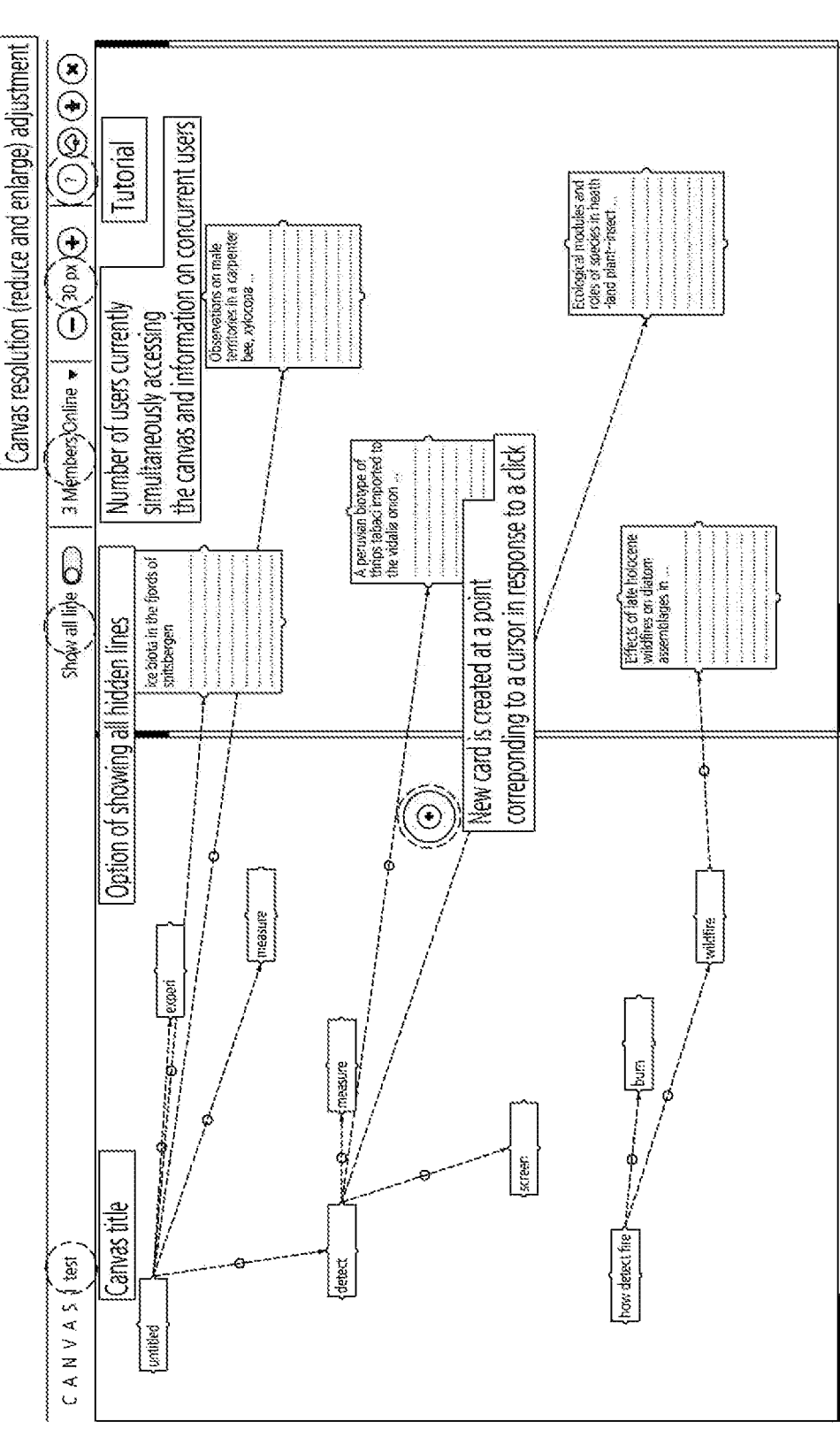

Referring to FIG. 14, in the case of the C-K canvas 10 implemented as a screen, the canvas title may be displayed on the upper bar. In addition, an item to select an option to show all hidden lines, an item to show the number of users currently simultaneously accessing the canvas and information on concurrent users, an item to adjust the canvas resolution (reduce and enlarge), a tutorial item, and so on may be included.

A portion where the mouse cursor is currently positioned may be displayed as a circle with a cross inside, and a new card may be created at the corresponding point when a click operation is performed.

Figure 15:
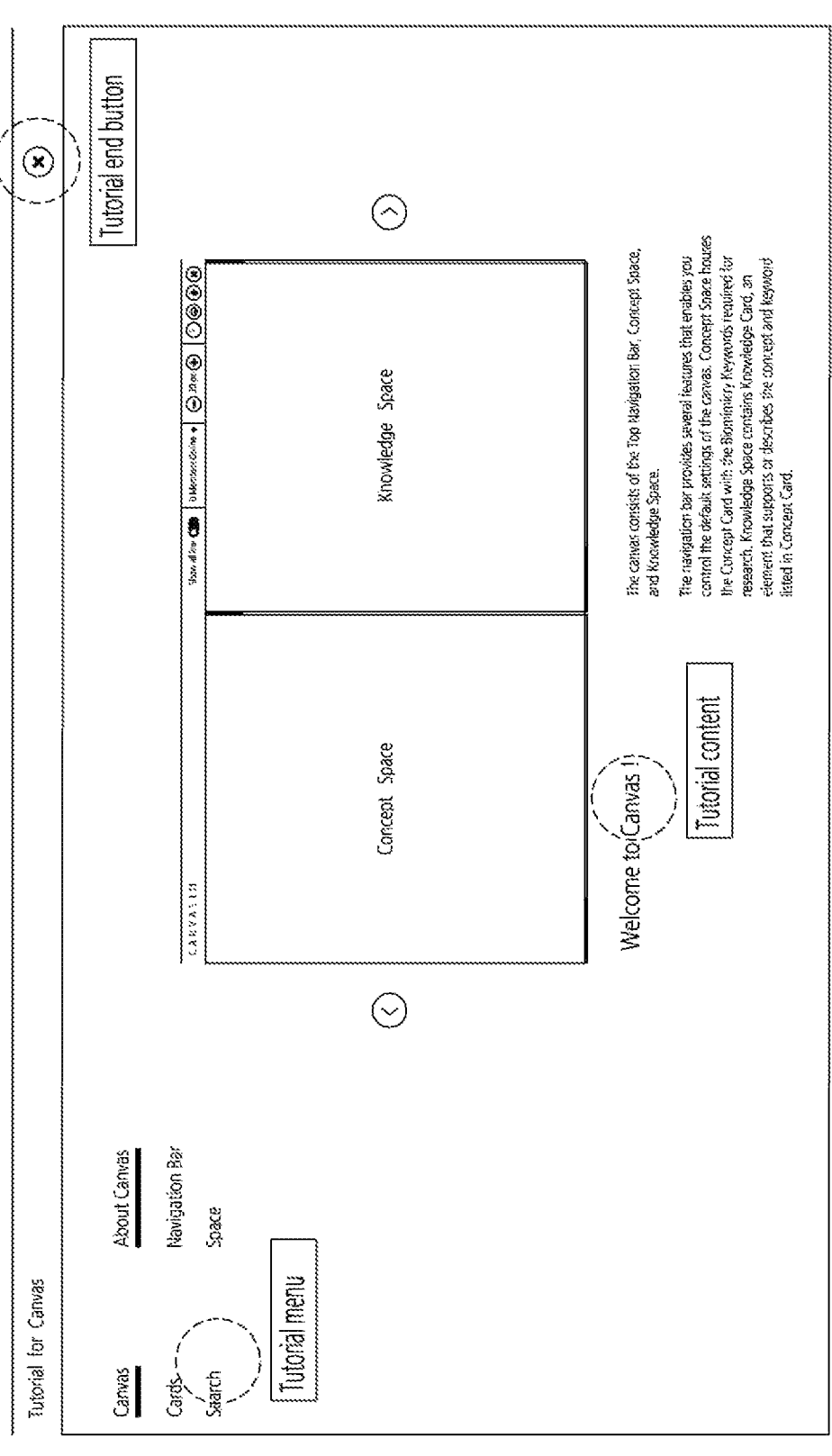
Figure 16:
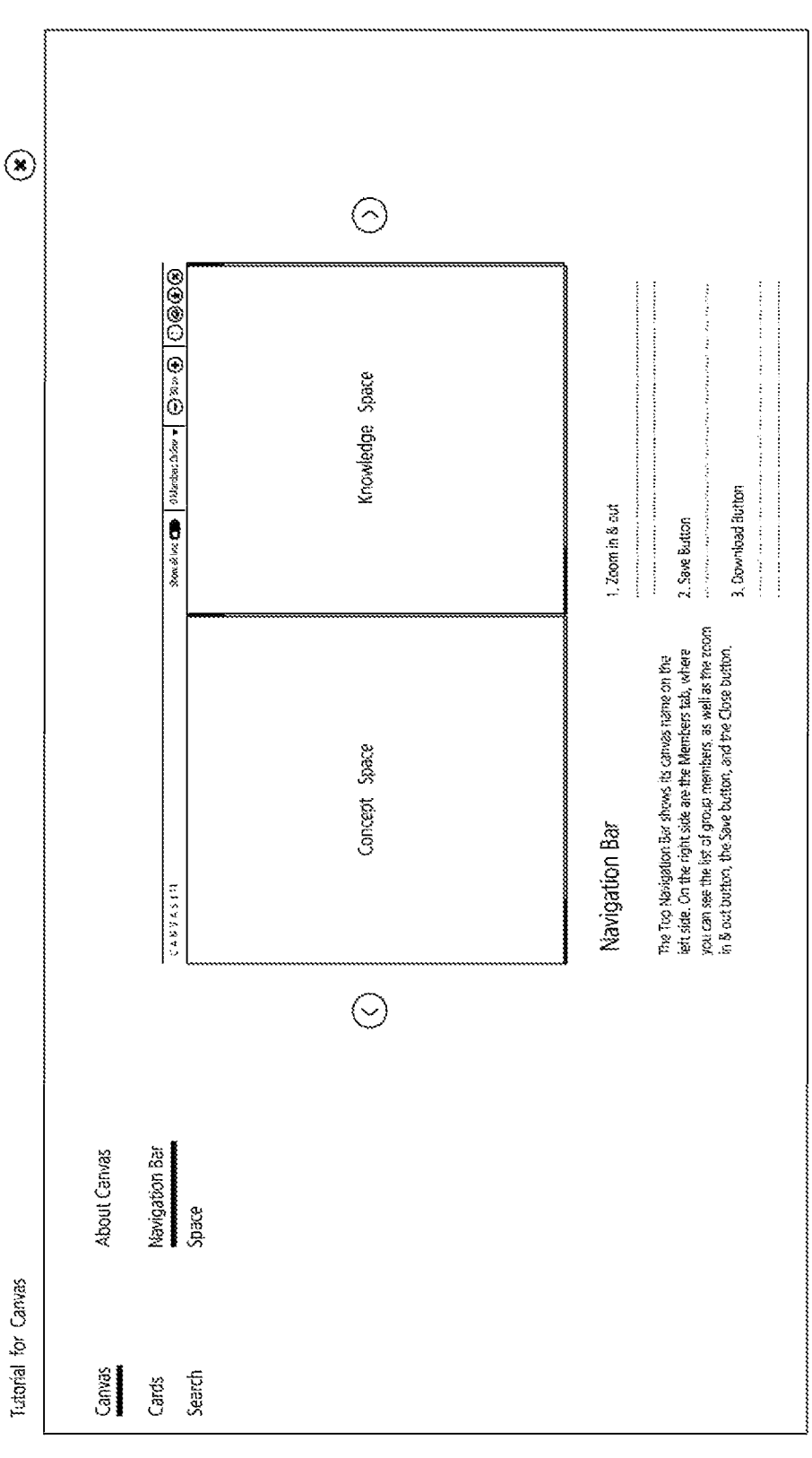

FIGS. 15 and 16, a case in which the tutorial item is selected is illustrated. A tutorial menu and tutorial contents may be indicated, and a button for ending the tutorial may be indicated at the top of the screen.

Figure 17:
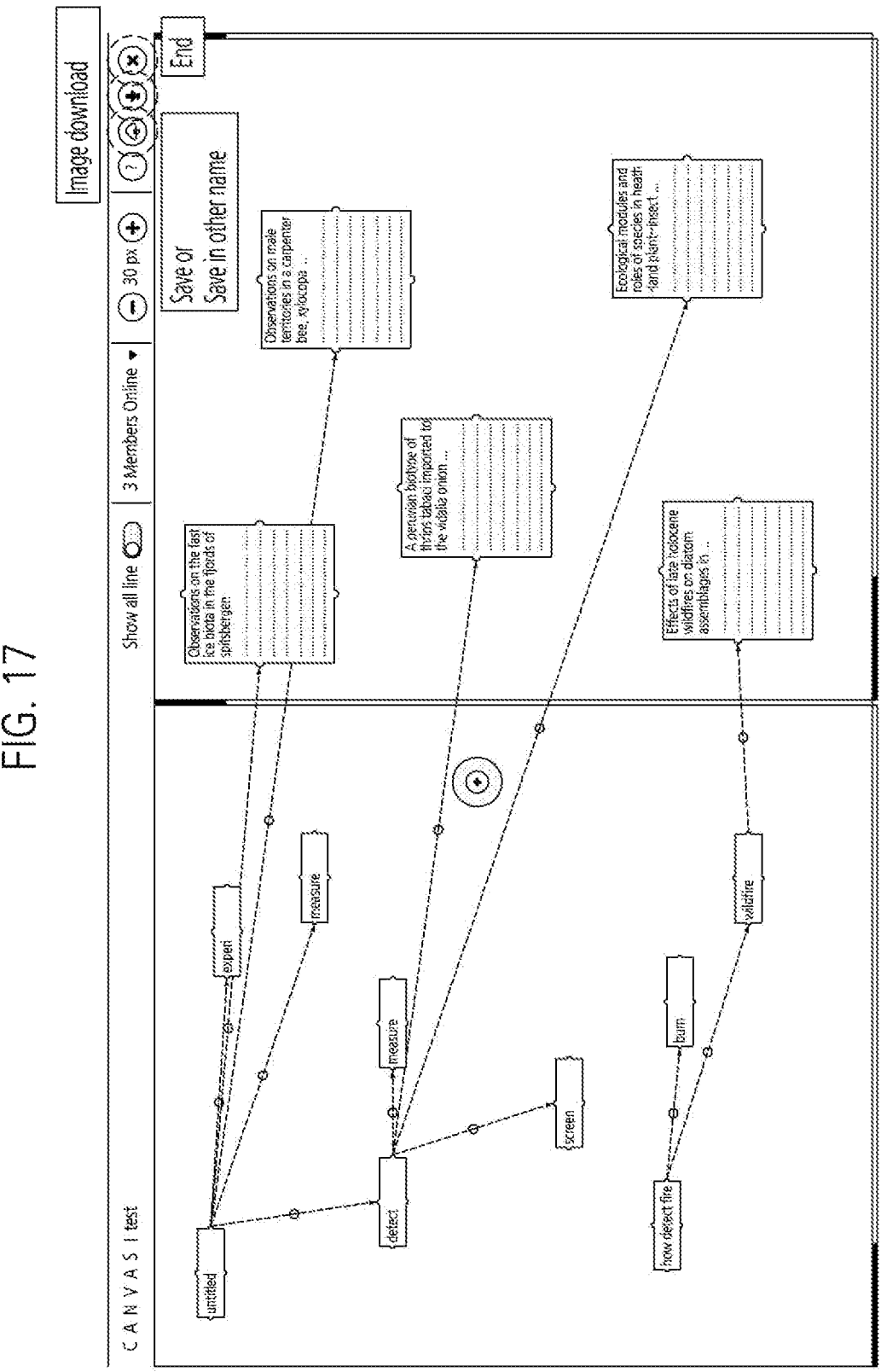

Referring to FIG. 17, a save button for saving the C-K canvas itself as a case, a button for downloading the C-K canvas itself as an image, and a button for terminating the program are shown at the top of the C-K canvas 10.

Figure 18:
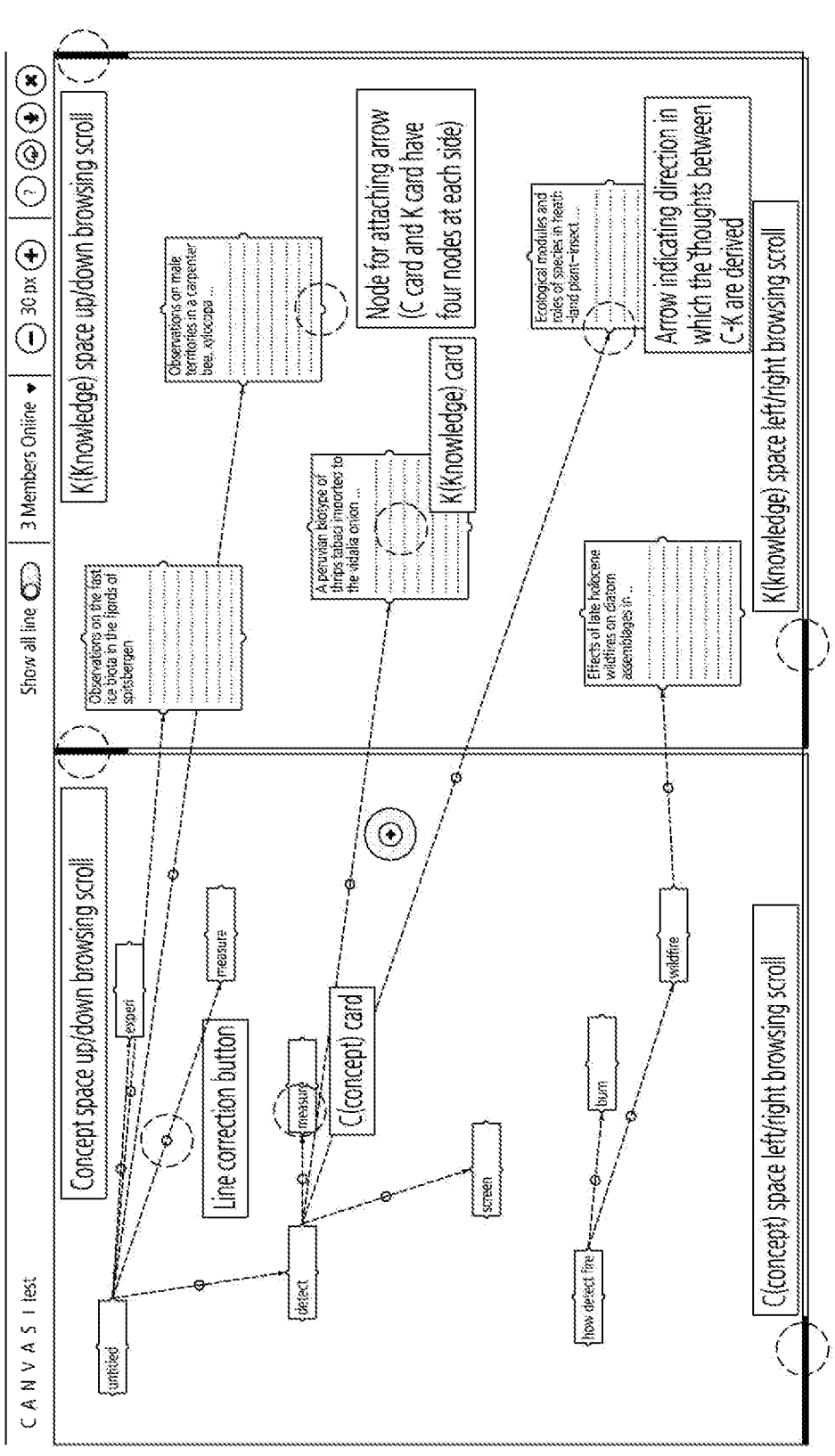

Referring to FIG. 18, a plurality of concept cards may be disposed in the concept space on the left, and scroll bars for vertical browsing and left/right browsing may be disposed on the right and bottom of the concept space, respectively. In addition, a button for modifying the link connection may be indicated on each link.

A number of knowledge cards are placed in the right knowledge space. Scroll bars for vertical browsing and left/right browsing may be disposed on the right and bottom sides of the knowledge space, respectively.

Each card has 4 nodes on its top, bottom, left, and right, so links (arrow lines) indicating the connection relationship with other cards can be connected. And arrows can indicate the direction in which the thoughts between C-K are derived.

Figure 19:
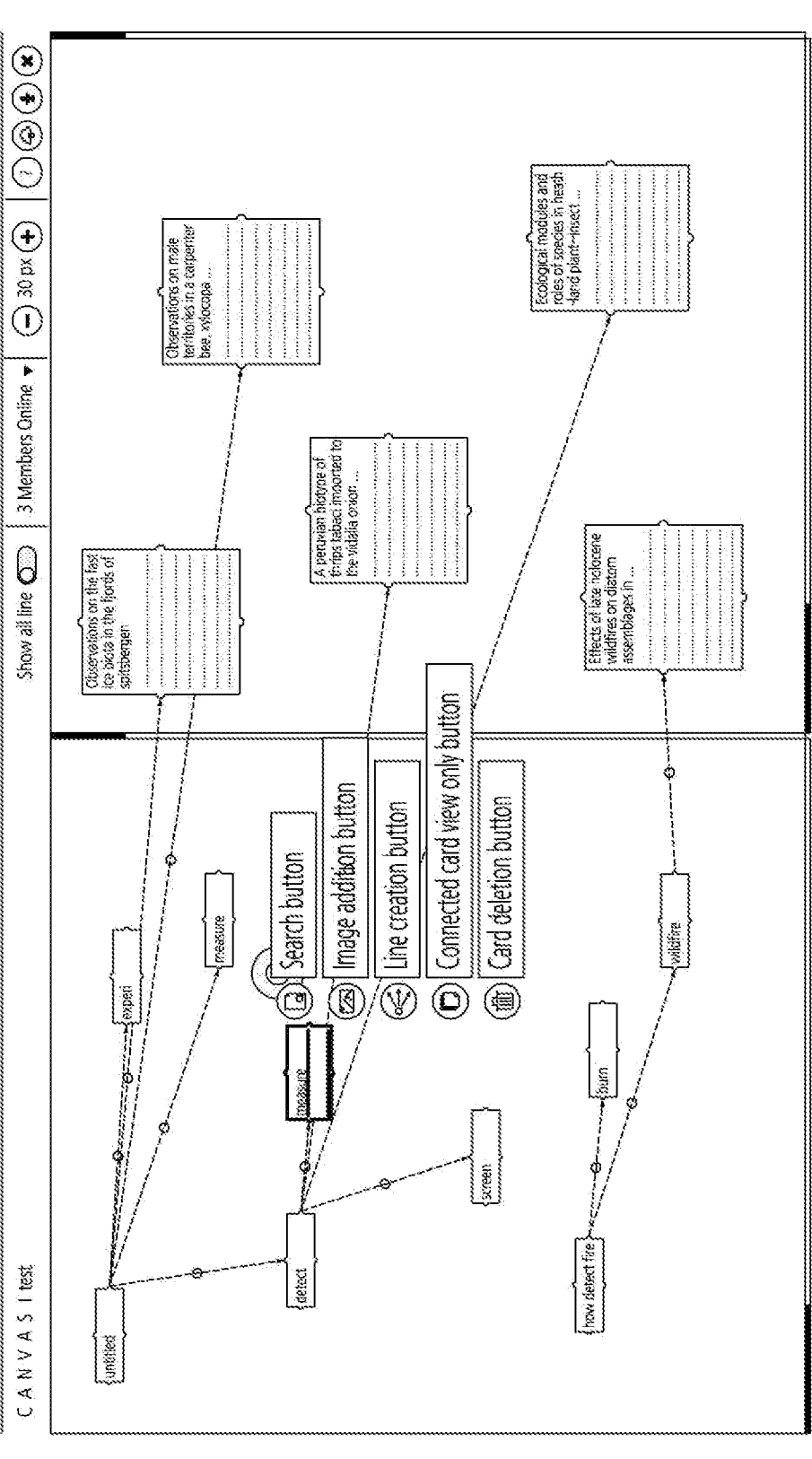

Referring to FIG. 19, an additional button activated when an arbitrary concept card is selected is indicated. At least one of a search button, an image addition button, a line creation button, a connected card view only button, and a card deletion button may be included.

The search button can search and list past cases with high similarity to the corresponding concept card through case reuse, and add concept cards and knowledge cards included in the past case to the current C-K canvas.

The image add button allows related images to be added to the corresponding card. Images can be added by browsing within the computer running C-K canvas or by downloading from an external server via Internet connection.

The line creation button can be used to add a connection relationship that the current user thinks in addition to the link (or line) automatically created during card registration.

Figure 20:
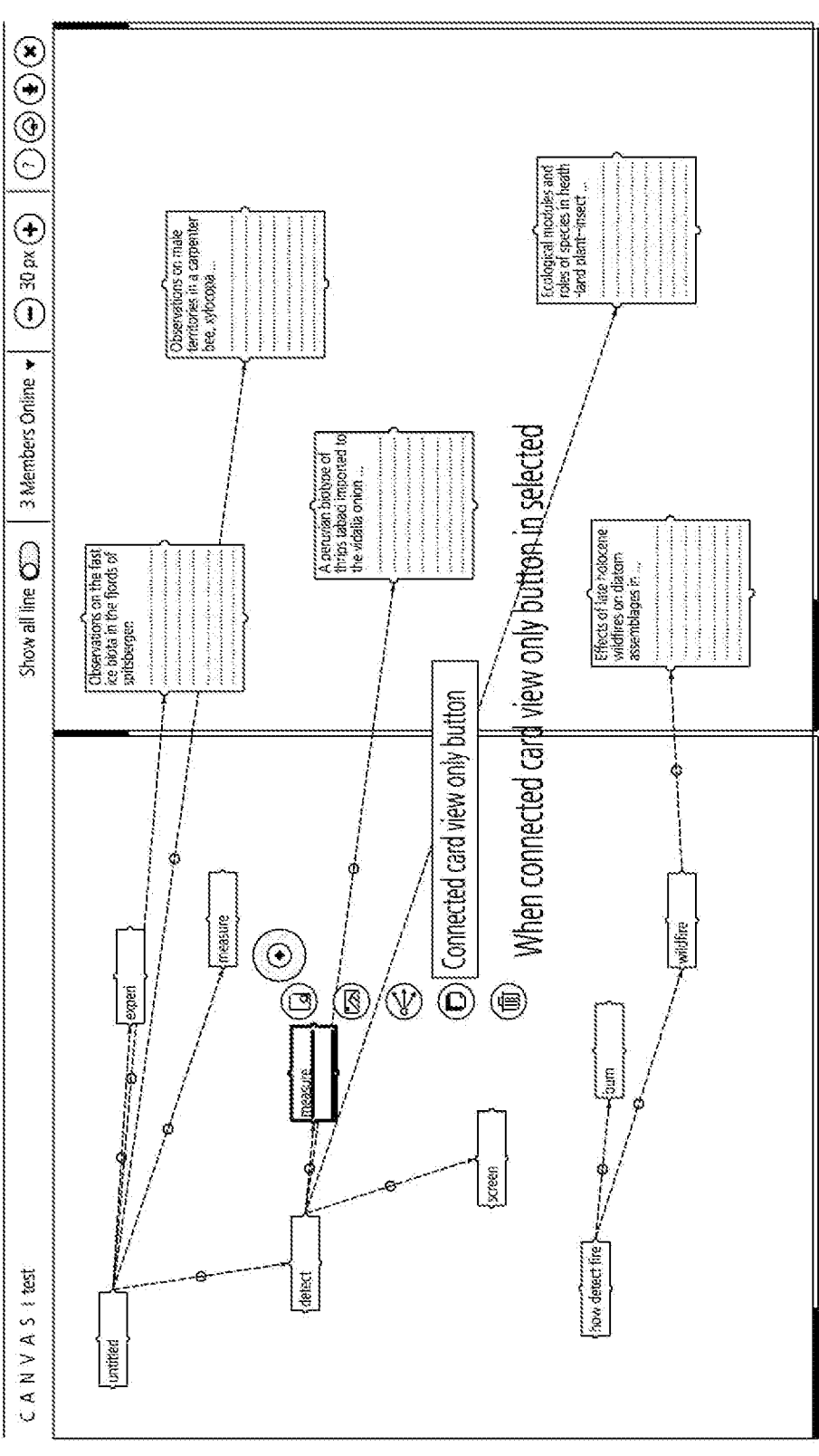
Figure 21:
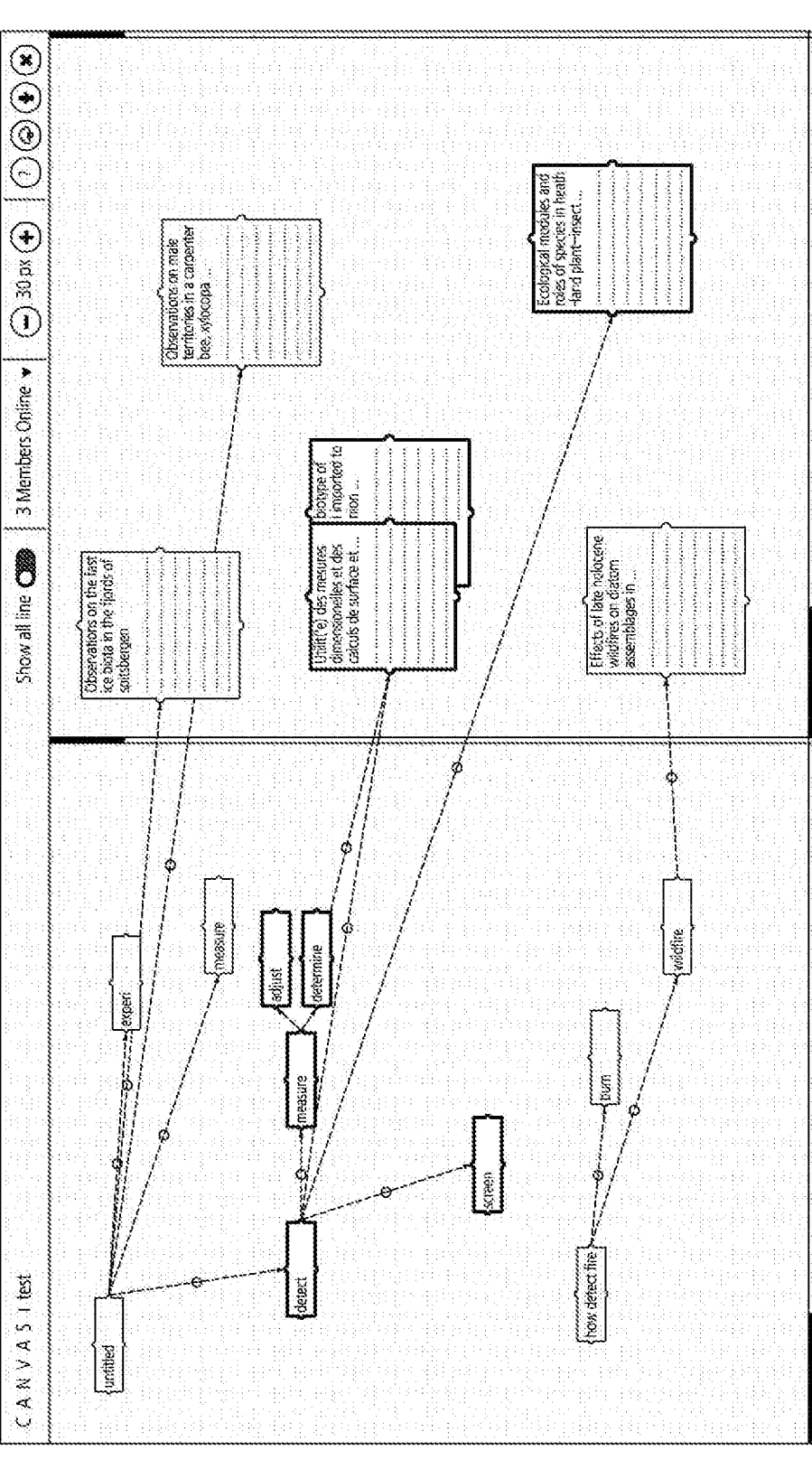

In the case of the view only connected card button, referring to FIGS. 20 and 21, only the cards connected directly or through one step to the corresponding card are highlighted and displayed, so that the connection relationship to the corresponding card can be more clearly confirmed. This will be useful in a situation where the link connections become complicated due to the placement of multiple concept cards and knowledge cards, and it is difficult to grasp the connection relationship at a glance.

The card delete button can delete the card from the current C-K canvas.

The search button will be described in more detail.

Figure 22:
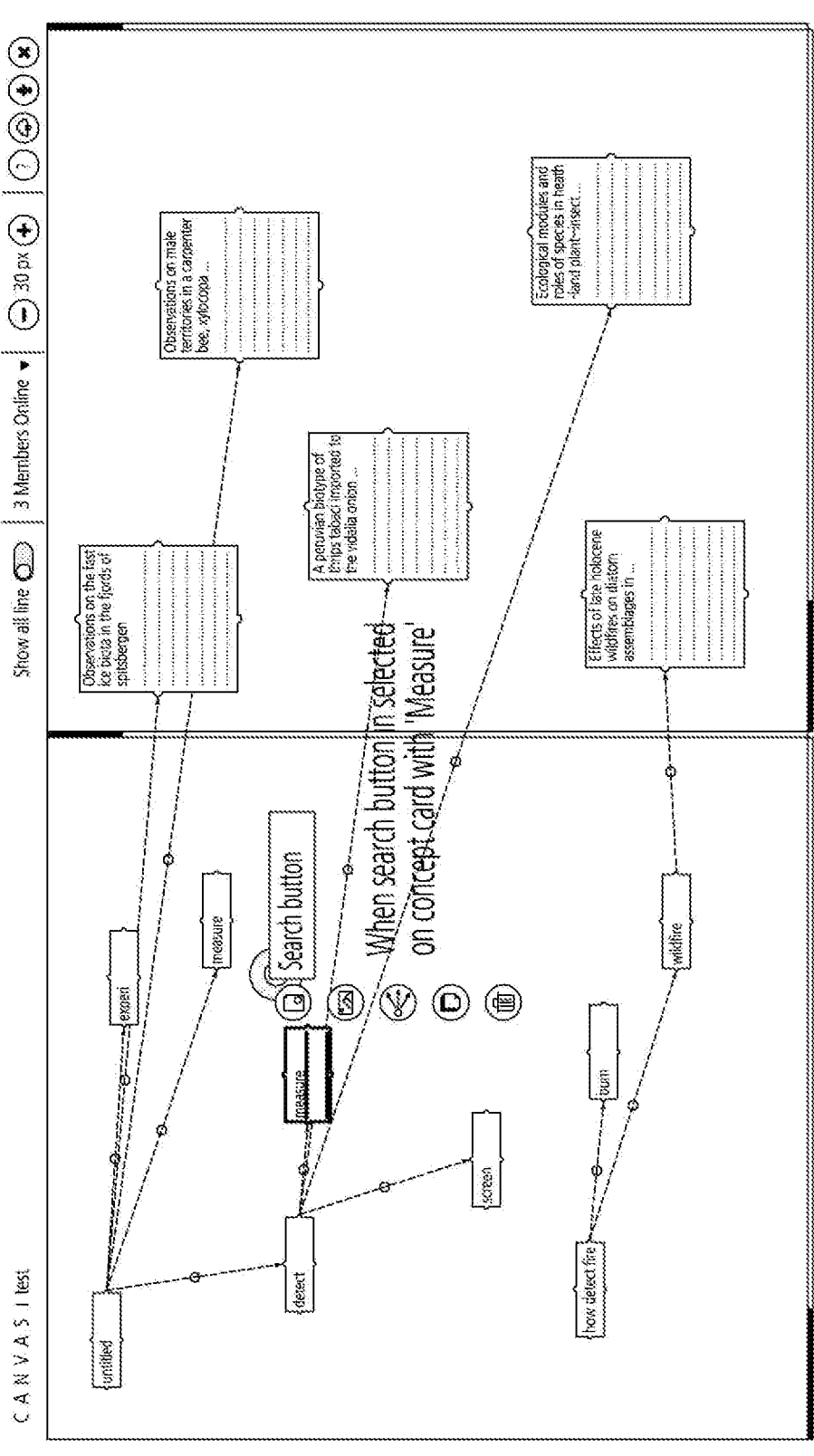
Figure 23:
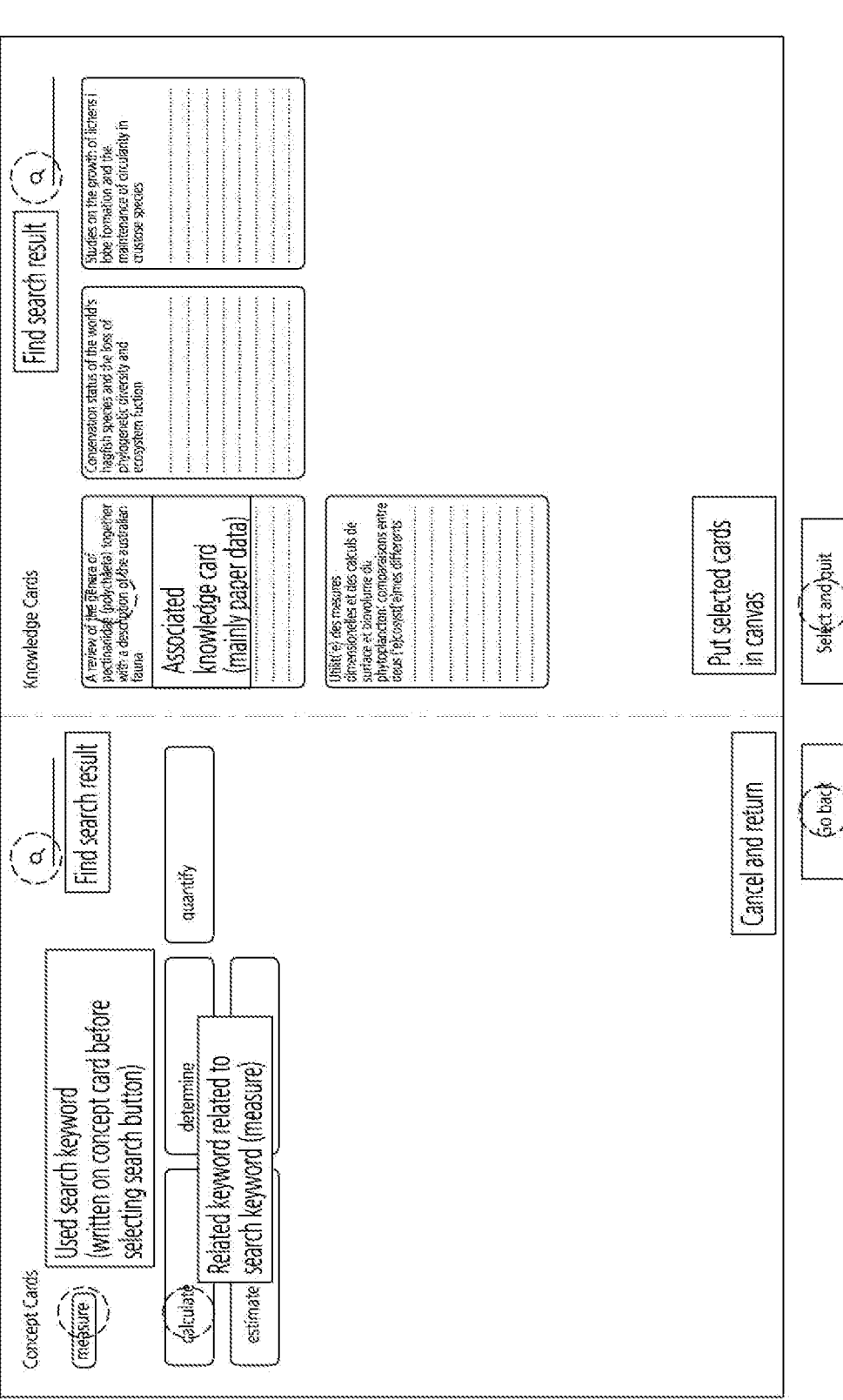

Referring to FIG. 22, when a search function is selected in a concept card written 'Measure' as shown in FIG. 23, a plurality of concept cards and a plurality of knowledge cards may be searched.

In this case, the search keyword used is 'measure' written on the concept card before the search function button is selected, and one or more of related keywords may be presented as a concept card candidate. Also, a knowledge card (mainly paper data) related to the search keyword may be presented as a knowledge card candidate.

In one embodiment, these concept card candidates and knowledge card candidates may be searched and recommended with reference to past cases with high similarity through case reuse.

Figure 24:
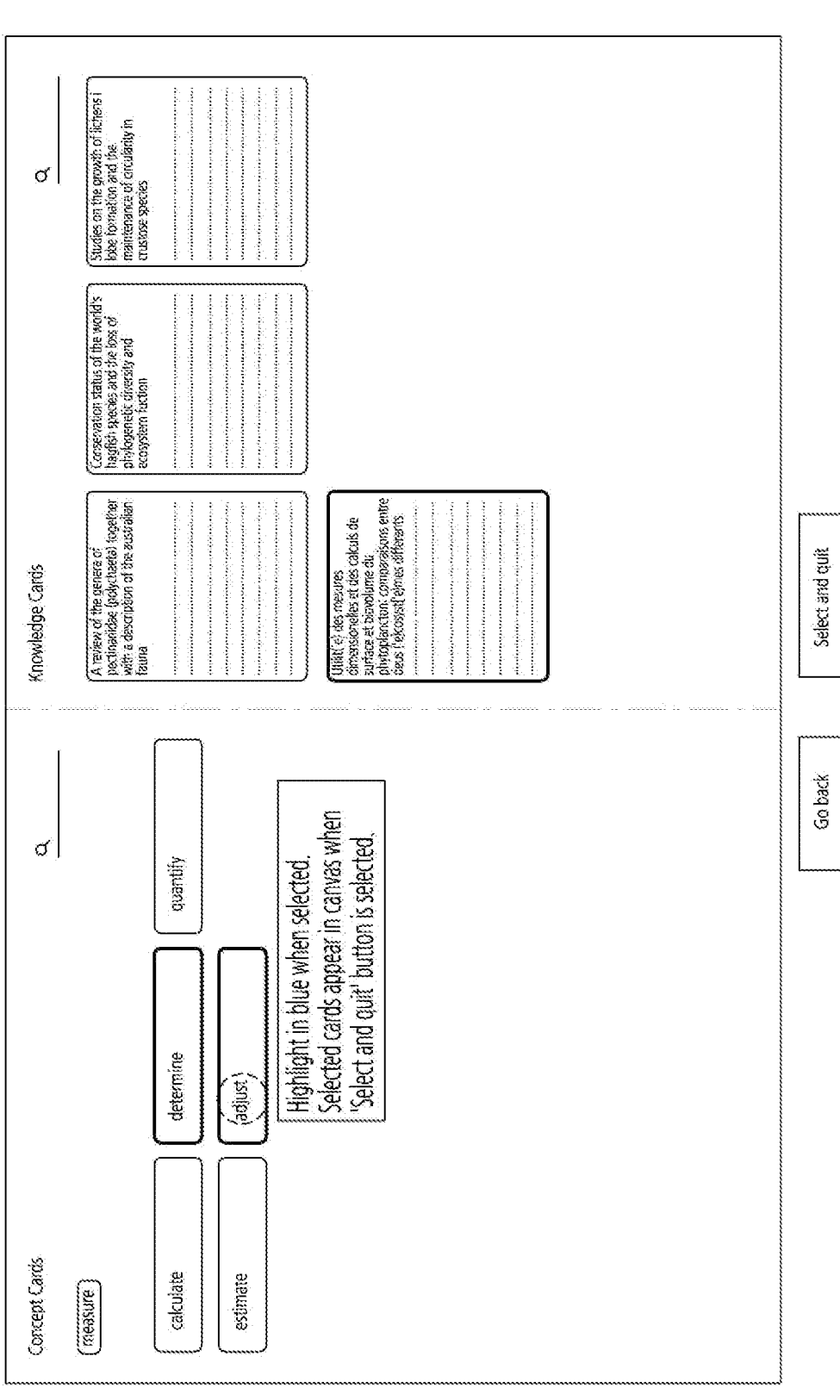

Referring to FIG. 24, card candidates selected by the user from among the presented concept card candidates and knowledge card candidates may be indicated distinctively from other card candidates (as example, highlighted in blue is shown in the figure).

Figure 25:
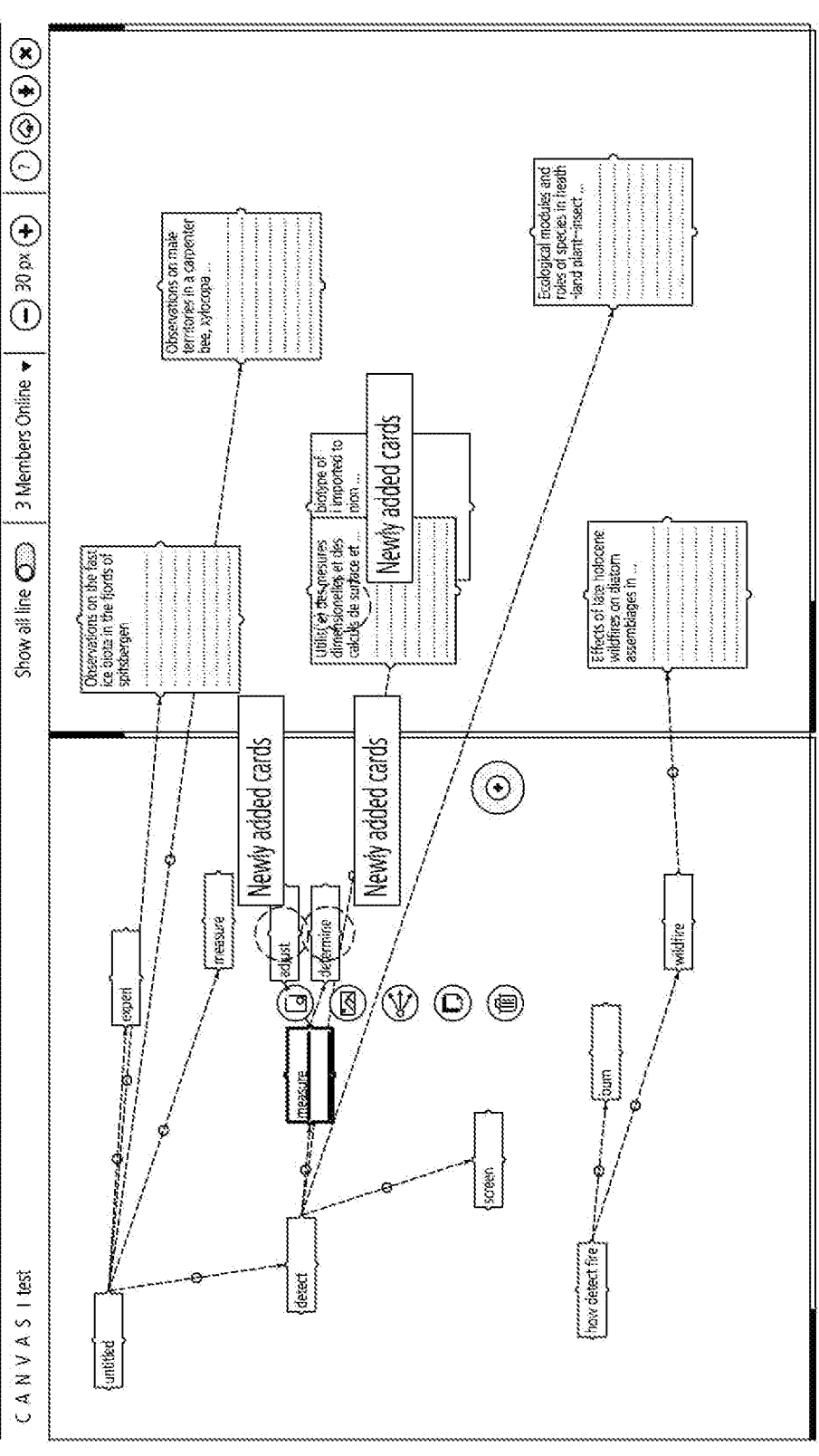

After that, when the final selection (Select and quit) button is selected, the selected cards appear on the C-K canvas as shown in FIG. 25. In this case, links are automatically created between the newly added cards and the concept card on which the search was performed to form a connection relationship.

Referring back to FIG. 1, the case management module 120 may register and manage the current CK canvas (various concept cards and knowledge cards and their connection relationships) created through the chaining process of concepts and knowledge by the designer as one case in the case storage.

Referring to FIG. 5, the diagram-based ideation method is as follows.

The C-K canvas is executed in S300. When a user input such as registration of a concept card is received in S305, the concept card is registered in the concept space in S310.

In addition, when an associated card search request is input through the additional function selection for the selected concept card from among the registered concept cards, associated cards having high similarity are recommended through case reuse in S315. The recommended associated cards are listed and displayed as candidates for registration, and can be selected by the user.

The selected associated cards may be registered in the concept space and the knowledge space according to their properties in S320. Then, a link connection is established with the concept card requested to be searched in S325.

S315 to S325 may be repeatedly performed several times during the process of the user chaining concepts and knowledge for problem-solving.

When the organization of ideas and expertise is completed on the CK canvas, the CK canvas containing information on the placements and interconnections of the concept cards and the knowledge cards may be stored in the case storage as a new case (see S330 in FIG. 11).

Also, the case management module 120 may include a case reuse unit 121.

The case reuse unit 121 may provide (or explore) past cases with high similarity for reference by using similarity assessment to refer to similar past cases among cases stored in the case storage when a problem-solving is tried for a new case in S400.

In addition, it is possible to analyze which index had the greatest influence by searching the context to find the reason of why the case was reflected with the similarity assessment indices of the past case that the designer decided to reflect in S405.

According to the analysis result, the influence (weight factor) of the indices may be updated and applied to the next similarity assessment in S410.

The case reuse unit 121 may operate in conjunction with the associated card search unit 115.

Hereinafter, the knowledge-based system 130 will be described. In one embodiment, the knowledge-based system 130 may enable a designer in the bio-inspired design to conduct an effective search by using various information and conditions by implementing biological system information, which is subject of mimicking and applying in bio-inspired design, including physical relations, ecological relations and/or biological relations, as a comprehensive causal model, and constructing it by ontology. In particular, it makes it possible to effectively search and recommend concepts and/or knowledge that can be derived from any concept card through similarity assessment from past cases.

Biological system information specifies physical phenomena, biochemical phenomena and so on in an individual organism that is a subject of mimicking and application as physical relations, ecological relations, and biological relations. Biological system information can be extended an interaction between entities or an interaction between a plurality of species.

In other words, as it could be possible that one organism is directly mimicked but also possible that biological phenomena in organism, interaction(s) made by several entities, or interaction(s) made by various species of organisms are utilized directly or indirectly, biological system information can encompass biological phenomena in individual organism or interactions between organisms or species in order for designers to conceive various ideas in wider range.

For example, if biological information about European-starling having an enzyme that can catalyze alcohol decomposition for alcohol detoxification is stored and managed, a designer who is trying to develop a product for catalyzing alcohol decomposition can search and utilize information about European-starling by searching biological system information about catalyzing alcohol decomposition during the process of linking concepts and knowledge using C-K canvas 10.

The knowledge-based system 130 may include a similarity assessing unit 131, a causal model database 133, and a term dictionary database 135.

In the term dictionary database 135, terms that are needed to index physical relations, ecological relations, and/or biological relations, which are included in biological system information.

In the term dictionary database 116, a scientific name dictionary in which scientific name terms, for example, according to ITIS (International Taxonomy Information Systems) standard, references quoted in STONE's paper publically published in 2014, and so on may be included as index terms. By using scientific name terms, it would be advantageous for the present invention that can collect biological system information about 21,000 genera based on ITIS.

In addition, since function, material, energy, and/or signal terms are needed to index physical relations and ecological relations respectively, a function term dictionary, a material term dictionary (e.g., Material>Liquid>acid, chemical, water, blood, etc.), energy term dictionary (e.g., Energy>Hydralic>pressure, osmosis etc.), and/or signal term dictionary (e.g., Signal>Sense>Detect>detect, locate, see/Signal>Status>change, fatty, variation, etc.), which are edited by experts, may be stored in the term dictionary database 116. Terms related to EPH (Ecological Phenomena) may be composed of data defining classification relation according to each category of function, material, energy, and/or signal.

As components for collecting and indexing biological system information, the knowledge-based system 130 may further include a document gathering unit, a collection database, a document parsing unit, and an index processing unit.

The document gathering unit collects BS (Biological structure) documents constituting of natural language. BS documents may be, for example, natural-language based HTML document arranged by biologists. Of course, author or type of BS documents should not be limited to the aforementioned, but any documents available for categorizing physical relations, ecological relations, and/or biological relations, and creating a causal model would be enough.

The collection database stores BS documents that the document gathering unit collected.

The document parser parses BS documents collected by the document gathering unit to analyze a sentence structure of BS documents and to construct the sentence as a tree. The document parser may use Scrapy parser.

The index processing unit indexes information that the document parser analyzed according to an ontology structure (see FIG. 8) in which the conventional SAPPhIRE model represents a biological system based on complemented causality.

That is, for information analyzed by the document parser, the index processing unit indexes biological relations of individual organism based on scientific name terms stored in the term dictionary database 135, and indexes each of physical relations and ecological relations among biological system of the organism based on terms representing function, material, energy, and/or signal respectively.

Biological system information may be derived from a triple form of subject-predicate-object, but, as shown in FIG. 8, may be structured to combine physical relations, ecological relations and/or biological relations that represent a mechanism of the organism and a causality manifested through the mechanism.

The smallest unit for indexing organism based on information analyzed from the collected BS documents is node, and connection information of each node forms relationship information.

Referring to FIG. 8, in physical relations of biological system information, Input (e.g., energy, signal, and/or material input) may activate PEF (Physical Effects), PEF may create PPH (Physical Phenomena), PPH may create CoS (Change of State), and CoS may be interpreted as Action.

Physical relations is information representing in a causality way that one organism undergoes a certain CoS and what causes a certain PPH through a certain PEF to achieve a certain objective (Action, Goal).

In detail, CoS relates to how a state is changed between before achieving the objective and final result, and a static state of precondition and post condition may be indexed in a dynamic relationship.

PEF relates to a strategy used to achieve the objective, and may be generally indexed as strategies that are contained in an ecology dictionary, a physics dictionary, etc., to have definitions (i.e., definition corresponding to the word).

PPH relates to how a strategy is specifically implemented, and may be indexed with a combination of verb and object that are terms defined in a function term dictionary (verb), and an energy dictionary, a material dictionary, and/or signal dictionary (noun as object), which were edited by experts to represent how it is specifically implemented.

precondition) to be changed to 'low concentration of alcohol' (i.e, post condition), and finally this CoS may be interpreted as Action such as 'alcohol detoxification'. Also from an analytical point of view, Action of 'alcohol detoxification' may be reinterpreted as a cause such as Input of 'many alcohol molecules'.

In addition, Action may be interpreted as EPH, so Action can be understood as a physical 'strategy' that an organism will take to do a certain behavior (or habit).

For example, if a designer who wants to develop an alcohol addiction treatment becomes aware of an ecological relation such that European starlings are likely to eat fermented fruits containing alcohol, the designer may infer an ecological relation of alcoholic who needs alcohol detoxification from the ecological relation of European starling, and thus may apply Action of 'alcohol detoxification' that European starling takes as physical strategy to do the behavior (habit) to develop alcoholic treatment as design strategy.

In exemplary case that the collected BS documents contain information about European starling capable of detoxifying alcohol, structured biological system information stored in the term dictionary database 116 can be shown in Table 1 as example. Of course, it will be appreciated that terms stored in correspondence with each node (i.e., Input, PEF, etc.) may be increased and diversified, if European starling has various characteristics.

TABLE 1

| Input | <Alcoholic compound> | <Alcohol> |
|---|---|---|
| Physical Effects | <Alcoholism treatment> | <Alcoholism-treatment> |
| Physical Phenomena | <Catalyze> + <Alcohol decomposition> | <Catalyze> + <Alcohol + Decomposition> |
| Change of State | <High concentration of alcohol> + <Low concentration of alcohol> | <High + Density + of + Alcohol> + <Low + Density + of + Alcohol> |
| Action | <Alcohol detoxification> | <Alcohol + Detoxification> |
| Ecological Phenomena | <Ingest> + <Fermented fruit> | <Ingest> + <Fermented + Fruit> |
| Ecological Behaviors | <Alcohol abuse> | <Alcohol + Abuse> |
| Organ | <Alcohol decomposition enzyme> | <Enzyme> |
| Part | <Stomach> | <Stomach> |
| Entity | <European starling> | <European-starling> + <Sturnus vulgaris> |

For example, if the European starling detoxifies alcohol, an alcohol detoxification may correspond to Action, CoS may be a change from high concentration of alcohol to low concentration of alcohol, and an alcoholism treatment may In addition, in an exemplary cast that another collected BS documents contain information about European starling having a light skeletal system for reducing air resistance, biological system information about European starling may be additionally generated and managed as shown in Table 2.

TABLE 2

| Input | <Kinetic energy> + <Air resistance> | <Kinetic + Energy> + <Air> |
|---|---|---|
| Physical Effects | <Light weight skeletal system> | <Light-skeletal-system> |
| Physical Phenomena | <Reduce> + <Mass> | <Reduce> + <Body + Weight> |
| Change of State | <High weight> + <Low weight> | <High + Weight> + <Low + Weight> |
| Action | <Reducing energy consumption> | <Reduce + Energy + Consumption> |
| Ecological Phenomena | <Increase> + <Flight time> | <Increase> + <Flight + Time> |
| Ecological Behaviors | <Flight> | <Flying> |
| Organ | <Bone> | <Bone> |
| Part | <Skeletal system> | <Skeletal-system> |
| Entity | <European starling> | <European-starling> + <Sturnus vulgaris> | be PEF. Thus, Action, that is, objective can be achieved with an alcohol decomposition as PPH Specifically, Input such as 'many alcohol molecules' may activate PEF such as 'alcoholism treatment', 'alcoholism treatment' may create PPH such as 'catalyzing alcohol decomposition', as 'catalyzing alcohol decomposition' may create CoS causing 'high concentration of alcohol' (i.e., Referring to Table 2, biological system information about European starling is that Inputs such as kinetic energy and air resistance may activate PEF such as a light skeletal system, the light skeletal system may generate PPH such as a reduction in bone weight, the reduction in bone weight may create CoS causing a heavy mass to be changed to a light mass, and finally this CoS may be interpreted as Action such as a reduction in energy consumption. Also from an analytical point of view, Action of reduction in energy consumption may be reinterpreted as a cause such as Input of high kinetic energy and air resistance.

In addition, in ecological relations that European starling has a habit of flying efficiently, the designer may regard an ecology of European starling as an ecology of flying object (i.e., in flight), and may apply Action of reduction in energy consumption as a physical strategy that European starling takes to do the behavior to a design strategy for developing a flying object.

As can be seen in FIG. 8 and Tables 1 and 2 respectively, biological relations of biological system information may be consist of Organ, Part, and Entity. Biological relations may indicate that biological phenomena are associated with which organ of an organ in an organism, and Part refers to a part to which the organ belongs.

Entity is an element for indexing that each biological system information is associated with which organism, is the owner of Organ and Part, and is the organism in which the biological phenomena can be observed.

For example, in case of a beetle that produces iridescent color, the beetle may be indexed as Entity, shell may be indexed as Part of biological system since cuticle belongs to shell of beetle, and cuticle of shell may be indexed as Organ.

Referring again FIG. 1, the ontology structure (see FIG. 8) designated by the index processing unit and biological system information that is generated based on terms from each dictionary stored in the term dictionary database 135 are stored in the causal model database 133. Thumbnail images corresponding to each biological system information may be further stored in the causal model database 133.

Hereinafter, a syntax for storing terms for each element in the causal model database 133 will be briefly described.

CoS element may be stored according to a syntax of Expression 1.

$$COS_{Biological\ System}=\{State_{pre},State_{post}\}$$

$$State_{pre}=\{Adj_{pre},Noun_{pre}\}$$

$$State_{post}=\{Adj_{post},Noun_{post}\} \qquad \text{Expression 1}$$

CoS may be stored as a precondition $State_{pre}$ and a post condition, $State_{post}$, and consist of an adjective part Adj and a noun part Noun. In the term dictionary database 135, the adjective part index terms may be stored in a state adjective dictionary, and the noun part index terms may be stored in the material term dictionary, the energy term dictionary, and/or the signal term dictionary respectively.

PPH element may be stored according to a syntax of Expression 2.

$$PPH_{Biological\ System}=\{Predicate_{physical},Object_{physical}\} \qquad \text{Expression 2}$$

PPH may consist of a verb part $Predicate_{physical}$ and a noun part ($Object_{physical}$. In the term dictionary database 135, the verb part index terms may be stored in the function term dictionary, and the noun part index terms may be stored in the material term dictionary, the energy term dictionary, and/or the signal term dictionary respectively, as described above.

PEF element may be stored according to a syntax of Expression 3.

$$PEF_{Biological\ System}=\{Index_{physicaleffect}\} \qquad \text{Expression 3}$$

PEF may be indexed with one of index terms registered in a PEF index term dictionary stored in the term dictionary database 135. The PEF index term dictionary may be stored in a format of 'index term' and 'definition of index term' (e.g., 'Camouflage'+'Definition of camouflage') in the term dictionary database 135.

Input element may be stored according to a syntax of Expression 4.

$$INP_{Biological\ System}=\{Index_{material},Index_{energy},Index_{signal}\} \qquad \text{Expression 4}$$

Input that activates biological system information may consist of related material index term $Index_{material}$, energy index term $Index_{energy}$, and/or signal index term $Index_{signal}$. These may be designated from terms registered in the material term dictionary, the energy term dictionary, and/or signal term dictionary stored in the term dictionary database 135.

EPH element may be stored according to a syntax of Expression 5.

$$EPH_{Biological\ System}=\{Predicate_{ecological},Object_{ecological}\} \qquad \text{Expression 5}$$

EPH may consist of a verb part Predicate about 'How' and a noun part Object about 'What'. For example, biological phenomena (camouflage) that cause an illusion to prevent from being detected by an enemy may have a biological function of avoiding enemy (body-material). Index terms of the verb part and the noun part may be stored in advance stored in the term dictionary database 135 as the function term dictionary, the material term dictionary, the energy term dictionary, and/or signal term dictionary.

EBH (Ecological Behavior) element may be stored according to a syntax of Expression 6.

$$EPH_{Biological\ System}=\{Index_{ecologicaleffect}\} \qquad \text{Expression 6}$$

EBH element may be indexed with one of index terms registered in EBH index term dictionary stored in the term dictionary database 135. For example, the biological phenomena that cause an illusion of foe to prevent from being detected has a biological behavior such as camouflage. Index term dictionary may be stored in a format of 'index term' and 'definition of index term' (e.g., 'Herbivore'+ 'Definition of herbivore') in the term dictionary database 135.

Organ element and Part element may be stored respectively according to a syntax of Expression 7.

$$ORG_{Biological\ System}=\{String_{organ}\}$$

$$PRT_{Biological\ System}=\{String_{part}\} \qquad \text{Expression 7}$$

Organ element and Part element may be indexed with terms in a biological word dictionary stored in the term dictionary database 135.

Entity element for indexing that biological system information is associated with which organism may be stored according to a syntax of Expression 8.

$$ENT_{Biological\ System}=\{ID_{ITIS},Index_{scientificname},Index_{commonname}\} \qquad \text{Expression 8}$$

In order to make an association search possible, Entity may be indexed by a scientific name according to ITIS system, and $ID_{ITIS}$ may index unique ID (number) of organism, $Index_{scientificname}$ may index scientific name (text), and $Index_{commonname}$ may index a common name (text) from 'ITIS scientific name dictionary'. ITIS scientific name dictionary for indexation may be stored in the term dictionary database 135.

Action element may be stored respectively according to a syntax of Expression 9.

$$ACT_{Biological\ System}=\{String_{action}\} \qquad \text{Expression 9}$$

Action element may be not stored in a dictionary, and indexed with a description summarized from a design strategy that a designer can obtain from biological system information.

As described above, since biological system information may be represented and respectively indexed with causal model in which physical relations, ecological relations and/or biological relations in each organism have mutual connections (directionality), it is advantageous for a designer to search biological system information that is useful to his idea.

The similarity assessing unit 131 may receive the search query related to the current cards from the associated card search unit 115, may assess similarity between the search query and each biological system information stored in the causal model database 133, and may provide biological system information having similarity equal to or greater than a threshold value to the associated card search unit 115. The associated card search unit 115 may process and express the provided biological system information into a plurality of associated cards.

The similarity assessing unit 124 may manage biological system information store in the causal model database 122, for example, in Python language.

When the associated card search unit 115 converts the card (especially, the description of the card) into the search query, the search query consists of a natural language phrase and can be described as a combination of <Current State> and <Expected Result>.

In case that the search query is described in a combination of <Current state> and <Expected result>, it will be advantageous that the causality will be more clarified when conducting search, and it will be also effective because biological system information according to the present embodiment adopts a causal model that is expressed in a homogeneous structure.

The associated card search unit 115 may decompose the text in the card into tokens, which are words at meaningful level that are processed by a conventional natural language processing method, and analyze grammatical components of each token (e.g., adjective, verb, noun, etc.). In addition, the associated card search unit 115 may refer to terms stored in the term dictionary database 135 of the knowledge-based system to generate corpus data set of tokens with query phrases of <Current state> and <Expected result>(See 215). The corpus data set may be represented in form of a list by tokenizing words and eliminating sentence symbols and stopwords (e.g., a, an, for, and, etc.).

The associated card search unit 115 may confirm whether the corpus data set corresponding to the analyzed search query exists for <Current state> and <Expected result>, and provide corpus data set to which a corresponding option value is added to the similarity assessing unit 131.

Even in case that corpus data set corresponding to the search query to be provided to the similarity assessing unit 131 includes any one of <Current state> and <Expected result>, the similarity assessing unit 131 may be implemented to conduct a search of biological system information and perform a similarity decision.

This is because that the bio-inspired design basically assumes a design thinking based on an inference strategy. Thus, a designer may not specify <Expected result> for the purpose of checking various results available under <Current state> condition in order to find idea out, and also may not specify <Current state> for the purpose of checking various pre conditions available under <Expected result>.

Namely, not specifying any one of <Current state> and <Expected result> may be interpreted as an intention not to put a limitation on thinking, and this is a way of design thinking that help a designer infer inventively.

For example, in case that a causality is specifically fixed by associating <Current state> of 'high concentration of alcohol' with <Expected result> of 'low concentration of alcohol', result such as 'high concentration of alcohol' is maintained, but biological system information about Pelotomaculum Thermopropionicum that uses alcohol as an energy source cannot be searched.

The operation of the associated card search unit 115 will be described in detail. In case that any one of <Current state> and <Expected result> is specified in the search query, the associated card search unit 115 may utilize PEF element that represents CoS most abstractly among ontology structure of biological system information to set an option value that allows the similarity assessing unit 131 to assess a similarity between information indexed with PEF element of biological system information stored in the causal model database 133 and corpus data set of the search query, and to provide biological system information that are equal to or greater than a threshold value to the associated card search unit 115 (See S220 and S225 in FIG. 9).

However, in case that both <Current state> and <Expected result> are described in the search query, the associated card search unit 115 may utilize PPH among ontology structure of biological system information to set an option value that allows the similarity assessing unit 131 to assess a similarity between information indexed with PPH element of biological system information stored in the causal model database 133 and corpus data set of the search query, and to provide biological system information that are equal to or greater than a threshold value to the associated card search unit 115 (See S220 and S230 in FIG. 9).

In detail, since <Expected result> shows an expected behavior as result of change, <Expected result> may allow the similarity assessing unit 131 to collect verb tokes from corpus data set of <Expected result> and to assess similarity between each information indexed as PPH elements. On the other hand, since <Current state> shows a target to be changed, <Current state> may allow the allow the similarity assessing unit 131 to collect noun tokes from corpus data set of <Expected result> and to assess similarity between each information indexed as PPH elements.

By aggregating the calculation result of the similarity assessing unit 131 for verb tokens of <Expected result> and the calculation result of the similarity assessing unit 131 for noun tokens of <Current state>, the similarity assessing unit 131 may draw the similarity matrix and provide biological system information that are equal to or greater than the threshold value to the associated card search unit 115.

In addition, if a term registered in the biological word dictionary stored in the term dictionary database 116 is found in corpus data set, the associated card search unit 115 may set an option value that allows the similarity assessing unit 131 to further consider Organ, Part and Entity elements among the ontology structure of biological system information when assessing the similarity and also to use similarity assessment result when drawing the similarity matrix (See S235 and S240 in FIG. 9).

Here, the biological word relates to an organ, a part and/or an entity name (e.g., common name, scientific name, etc.) of an organism such as sensory-organ, lung, European starling.

But, if a term registered in the biological word dictionary stored is not found, the associated card search unit 115 may set an option value that allows the similarity assessing unit 124 not to consider Organ, Part and Entity elements when assessing the similarity.

In addition, if a term registered in the state adjective dictionary stored in the term dictionary database 135 is found, the associated card search unit 115 may set an option value that allows the similarity assessing unit 131 to further consider CoS elements among the ontology structure of biological system information when assessing the similarity and also to use similarity assessment result when drawing the similarity matrix (See S245 and S250 in FIG. 9). Here, a state adjective relates to size, shape, state, color, age, material, etc., among adjectives such as high, small, enormous, round, ceramic, metal, and so on.

But, if a term registered in the state adjective dictionary stored is not found, the associated card search unit 115 may set an option value that allows the similarity assessing unit 131 not to consider CoS element when assessing the similarity.

The associated card search unit 115 may provide the similarity assessing unit 131 with corpus data set and option value that are generated according to the search query to which the card is converted (See 255 in FIG. 9).

The associated card search unit 115 may output one or more biological system information provided as a result of the similarity assessment by the similarity assessing unit 131 as a plurality of card types as shown in FIG. 23. Alternatively, it can be output in the form of a table. Alternatively, the associated card search unit 115 may measure a derivativity (i.e., interrelationship) between at least one biological system information and generate a network graph by use of the measure derivativity (See S260 in FIG. 9). Of course, it will be appreciated that the similarity assessing unit 131 may measure the derivativity and the causal model canvas unit 158 may generate the network graph by use of the result of derivativity measurement. Of course, the similarity assessing unit 131 also performs the derivation measurement, and the result output unit 113 uses the derivation measurement result information to form a list or the network graph.

Hereinafter, it will be described that the similarity assessing unit 131 conducts the search by use of corpus data set corresponding to the search query that the associated card search unit 115 provides and biological system information about each organism stored in the causal model database 133, and assesses the similarity (See S260 in FIG. 9).

In order to perform the similarity assessment on biological system information stored in the causal model database 133 and corpus data set of <Current state> and/or <Expected result>, in case that n biological system information are stored in the causal model database 133, the similarity assessing unit 131 may generate a 1×n similarity matrix for comparison with corpus data set (See (a) in FIG. 10). Each similarity index assessment value may be initialized to zero before performing the similarity assessment.

In case that corpus data set for any one of <Current state> and <Expected result> corresponding to the search query is provided, the similarity assessing unit 131 may calculate a degree of topic interrelationship with definition text (stored in PEF index term dictionary) for each of corpus data set and n biological system information stored in the causal model database 133 by use of tf-idf (Term Frequency-Inverse Document Frequency) scheme, store the calculated value as similarity index assessment values of each biological information. If similarity value that was calculated already in previous similarity index assessment process exists, they will be summed.

Tf-idf scheme is a conventional scheme for comparing similarity between two documents with similarity of terms (tokens) used in each document. For example, in case that corpus data consists of [blood, alcohol, level, very, high], Tf-idf scheme compares the number of appearances in documents about 'Alcoholism-treatment' that is definition text of index term of PEF element with the number of appearances in definition documents for all terms in PEF index term dictionary. Since tokens such as level, very, high, etc. are frequently used in most of documents, it will be appreciated that relatively low similarity index value may be assigned to these tokens compared to other tokens such as blood, alcohol, etc.

But, in case that only corpus data set for both <Current state> and <Expected result> is provided, the similarity assessing unit 131 may generate a verb token set Wp by extracting verb tokens from corpus data set WER of <Expected result> and a noun token set Wo by extracting noun tokens from corpus data set Wcs of <Current state> by use of a conventional POST (Part of speech tagging) algorithm and so on.

For example, in case that corpus data set of <Current state> consists of [blood, alcohol, level, very, high], since there is no token that can be considered as verb, verb token set Wp will be empty, but the noun token set Wo will be generated as [blood, alcohol, level].

The similarity assessing unit 131 may generate the first similarity index calculation value by calculating similarity index between terms in the verb token set and verb part (Predicate$_{physical}$, see Expression 2) of PPH element of each biological system information. In addition, the similarity assessing unit 131 may generate the second similarity index calculation value by calculating similarity index between terms in the noun token set and noun part (Object$_{physical}$) of PPH element of each biological system information, and store multiplication of the first and the second similarity index calculation values as similarity index assessment value for each biological system information. If similarity index assessment value that was calculated already in previous similarity index assessment process (e.g., similarity index assessment based on the presence/absence of biological word) exists, they will be summed.

In above example, since the verb token set Wp is empty, the first similarity index calculation value will be zero. But, in case that the verb token set Wp is not empty and PPH element of a certain biological system information is indexed as <Adjust>+<Direction+of+Incident+Light>, the similarity index between the verb token in the verb token set Wp and <Adjust> as verb part of PPH element will be calculated.

As described above, since verb terms are registered in the function term dictionary stored in the causal model database 133, the first similarity index calculation value may be generated by calculating a semantic distance between the verb token of the verb token set Wp and Adjust.

The function term dictionary may be composed of a tree data structure to calculate semantic distance between each term. The first similarity index calculation value may be generated as a distance that verb token reaches Adjust via a parent node that is common and nearest from both verb token and Adjust (i.e., the number of edges connecting each hierarchical node). Thus, as farther the nearest parent node is away from the highest node, as higher the first similarity value will be. This type of tree data structure may be structured in similar manner to a hierarchical structure having a connection relationship between nodes so as to calculate the degree of kinship.

In addition, in case that the noun token set Wo is not empty and PPH element of a certain biological system information is indexed as <Adjust>+<Direction+of+Incident+Light>, similarity index between noun token of the noun token set Wo and 'Direction' and 'Light' as noun part of PPH element may be calculated. The second similarity index calculation value may also be calculated by use of semantic distance of term in same manner as the process of the first similarity index calculation value, and if nouns to be calculated are plural (e.g., 'Direction' and 'light'), for example, an average, a sum, or a maximum value of these may be calculated as the second similarity index assessment value.

Then, the similarity assessing unit 131 may check whether the state adjective (e.g., small, high, etc.) exists in corpus data set corresponding to the search query, and if exists, further perform similarity index assessment in consideration with the state adjective.

In case that the state adjective is found in corpus data set of <Current state> and/or <Expected result>, all multiplication of frequencies found in adjective part (See Expression 1) among index information of CoS element of each biological system information stored in the causal model database 133 may be stored as similarity index assessment value for each biological system information. If similarity index assessment value that was calculated already in previous similarity index assessment process exists, they will be summed. The state adjective of corpus data set of <Current state> may be compared to adjective part $Adj_{pre}$ of precondition and the state adjective of corpus data set of <Expected result> may be compared to adjective part $Adj_{post}$ of post condition, and if an adjective is found both in corpus data sets of <Current state> and <Expected result>, a multiplication of each frequency may be stored as the similarity index assessment value.

For example, in case that CoS element of a certain biological system information consists of <High+Weight> and <Low+Weight>, the adjective part of pre condition is 'High' and the adjective part of post condition is 'Low'. Assuming that state adjective of corpus data set of <Current state> is 'High, Small' and the state adjective of corpus data set of <Expected result> is 'Normal', 'High' is found once but 'small' is not found in state adjectives of <Current state> so the multiplication of frequencies is zero, and the frequency for state adjective of <Expected result> is zero. Thus, the similarity index assessment value is zero.

As described above, by using a mechanism of multiplying frequencies, in case that all elements are found, it can be used as an additional point to the similarity index assessment value.

In addition, as shown in (b) of FIG. 10, if corpus data set has a biological word, the similarity assessing unit 131 may further generate a 1×n sub similarity matrix.

For example, in case that corpus data set of <Current state> is [blood, alcohol, level, very, high] and corpus data set of <Expected result> is [blood, alcohol, level, normal], token such as 'blood' is a biological word registered in the biological word dictionary. The similarity assessing unit 131 may compare the biological word to each of n biological system information stored in the causal model database 133. If 'blood' was found twice in indexed terms corresponding to Organ, Part and Entity elements of $j^{th}$ biological system information, the sum of frequencies is two, and two as the similarity index assessment value between $j^{th}$ biological system information and token as the biological word included in corpus data set may be registered as $j^{th}$ element of the sub similarity matrix.

As described above, the similarity assessing unit 131 may generate each of the similarity matrix and the sub similarity matrix by use of corpus data set corresponding to the search query and biological system information for each organism stored in the causal model database 133. The similarity matrix is generated for all of designer's search requests, but the sub similarity matrix is generated only when a biological word is included in corpus data set.

Hereinafter, a process will be described that when the similarity assessing unit 131 provides the associated card search unit 115 with at least one biological system information with reference to the similarity index assessment value generated in the aforementioned process, the associated card search unit 115 may output at least one biological system information in the form of the plurality of cards. Alternatively, derivativity between each biological system information may be measured, and the network graph may be plotted according to the measured derivativity.

After assessing similarity between corpus data set and biological system information of each organism by use of the similarity matrix and/or the sub similarity matrix, the similarity assessing unit 131 may provide the causal model canvas unit 158 with at least one biological system information of which similarity index assessment value is equal to or greater than a threshold value. The threshold value may be, for example, designated as 0.75, which means to provide biological system information corresponding to the upper 75%.

Referring to FIG. 6, the recommendation method using case reuse in one embodiment is as follows.

(1) The entity value of the knowledge-based system 130 (first entity value) and the entity value of case-based C-K canvas (second entity value) are compared with each other.

Case-base is an information storage concept similar to a database, but it has meaning as a case storage in that cases are stored. In one embodiment, one C-K canvas is stored as one case.

Elements that can be placed in the concept space are 10 elements (CoS (Change of State), PPH (Physical Phenomena), PEF (Physical Effects), Input, EPH (Ecological Phenomena), EBH (Ecological Behavior), Organ, Part, Entity, Action).

The algorithm used to compare the first entity value and the second entity value is the same as the search algorithm used in the knowledge-based system 130 described above.

Instead, it is necessary for the knowledge-based system 130 to infer which element of the ten elements corresponds to one concept. It can use an algorithm to infer which scenario performs the similarity assessment when selecting a search scenario.

(2) The relationships of entities to be added to the C-K canvas are mapped from relationships between entities (causality). It is searched from the knowledge-based system 130.

If a search is performed from the contents described in one concept card, the related concept and related knowledge are recommended at the same time. In the database of the knowledge-based system, one case expression structure (a causal model of ten elements expressing the structure of a biological system) and a plurality of papers are already connected (refer to FIG. 11).

Therefore, when a related concept is recommended, the connection relationship within the 10-element causal model can be extracted. And in the case of recommending related knowledge, the connection relationship between the causal model and the papers can be extracted.

(3) The influences of the indices used in the assessment of similarity between entity values in (1) are reflected in order of magnitude.

When assessing each of 10 elements, the similarity between sentence structure elements such as verbs, objects, and adjectives is averaged to calculate the total similarity according to the elements.

When averaging, the contribution of each element is different. Some elements may lower the mean, and some may raise the mean.

This similarity sum value may be used to determine the placement priority of the associated cards upon recommendation.

However, cards that the user finally selects and adds to the C-K canvas may vary depending on the situation. The placement priority is high, so even if it appears first, the user may not select it. In this case, it is possible to keep a record of why the selected ones were selected.

For example, in functional lexical analysis, each verb and object are calculated and averaged. If the user continues to select only cards with high verb similarity, it may be desirable to forwardly arrange cards having a high verb similarity when the task (1) is next performed.

Therefore, the elements with the highest contribution are stored. When saving the C-K canvas according to one embodiment, it is possible to continuously update and save the record.

This can be used to increase the efficiency of recommendation results in the form of assigning a weight factor as a specific constant value to the factors with high contribution as reference data when the task (1) is next performed.

In particular, when using an artificial intelligence algorithm with a faster search speed that drives a recommendation system using quantum computing, it is essential to record the weight factor as a specific constant value for the factors with high contribution as mentioned here.

In the case of quantum computing, if the priorities of search results are recorded as constant values, a very fast search speed can be expected in a multidimensional element search scenario based on the results.

(4) The weight factor in the causalities within the knowledge-based system is updated.

In the recommendation result, weight factors for the relationships selected by the user may be updated and reflected in the knowledge-based system 130. This updated weight factor can be used to assess the similarity.

The weight factor can be assigned as an appropriate constant value. The determination of the constant value may be performed according to the determination of the target sensitivity value and the efficiency value for the recommendation result.

The diagram-based ideation platform apparatus according to one embodiment of the present invention described above may be implemented as a computing environment (e.g., personal computer, server computer, handheld or laptop device, mobile device (mobile phone, PDA, media player, etc.), multi-processor systems, consumer electronics, mini-computers, mainframe computers, distributed computing environments including any of the aforementioned systems or devices, etc.).

The computing environment may include, but is not limited to a processor (e.g., central processing unit (CPU), graphic processing unit (GPU), microprocessor, application specific integrated circuit (ASIC), field programmable gate arrays (FPGA), etc.), a memory (e.g., volatile memory (e.g., RAM, etc.), non-volatile memory (e.g., ROM, flash memory, etc.), magnetic storage, optical storage, etc.), input devices (e.g., keyboard, mouse, pen, voice input device, touch input device, infrared camera, etc.), output device (e.g., display device, speaker, printer, etc.) and communication connections (e.g., modem, network interface card (NIC), integrated network interface, radio frequency transmitter/receiver, infrared port, USB connection, etc.).

It goes without saying that the above-described diagram-based ideation method and the knowledge recommendation method using case reuse may be implemented as a software program or application embedded in a digital processing device and performed as an automated procedure according to a time-series sequence. Codes and code segments constituting the program or the like can be easily inferred by a computer programmer in the art. In addition, the program is stored in a computer readable media, and is read and executed by the computer to implement the method.

Although the above has been described with reference to the embodiments of the present invention, those of ordinary skill in the art will understand that various modifications and changes can be made to the present invention without departing from the spirit and scope of the present invention as set forth in the following claims.

What is claimed is:

1. A diagram-based ideation platform apparatus for searching biomimetics information, comprising:

a concept-knowledge (C-K) canvas programmed processor configured for:

providing the C-K canvas divided into a concept space which contains concept data and a knowledge space which contains knowledge data including the biomimetics information, and supporting a user's solution search for problem solving, wherein, after a chaining process which connects the concept data with the knowledge data to be searched for the concept data, the C-K canvas programmed processor visualizes on the C-K canvas interconnections connecting the concept data in the concept space to the knowledge data in the knowledge space containing the biomimetics information, wherein the concept data and the knowledge data with the interconnections are diagrammatically expressed, visualized to the user, and recorded over time for reuse; and a case management programmed processor configured for storing and managing the C-K canvas in which the user's solution search including the concept data, the knowledge data, and information on the interconnection relationship is completed, wherein the C-K canvas programmed processor comprises:

a canvas management computing unit configured for managing the C-K canvas;

a card management computing unit configured for converting the concept data and the knowledge data into respective concept cards and knowledge cards, wherein the card management computing unit is configured for registering, editing, and deleting the concept cards and the knowledge cards;

an associated card search computing unit configured for searching for and recommending an associated card related to a first card registered on the C-K canvas through a knowledge-based system; and a link connection computing unit configured for connecting a link between the first card and the associated card selected among the recommended associated cards, wherein the associated card search computing unit searches for a past case suitable for the first card by reusing the past case, and extracts other concept data and other knowledge data similar to the concept data described in the first card from a causal model included in the past case to recommend as the associated card, wherein the associated card search computing unit is configured for:

performing a similarity assessment by comparing a first entity value of entities of the knowledge-based system with a second entity value of other entities of the C-K canvas and generating indices representative of the similarity assessment, mapping connections of new entities to be added to the C-K canvas from causalities between existing entities of the knowledge-based system, determining a placement priority of the associated cards on the C-K canvas based on a highest order of the indices determined in the similarity assessment, and updating weight factors for relationships selected by the user and using the updated weight factors in the similarity assessment.

2. The diagram-based ideation platform apparatus of claim 1, wherein a concept card in which the concept data is converted into a card is placed in the concept space and a knowledge card in which the knowledge data is converted into a card is placed in the knowledge space, wherein connection of the link is automatically established and modifiable by a user.

3. The diagram-based ideation platform apparatus of claim 2, wherein elements that can be registered as the concept card is at least one of ten elements of a causal model used in the knowledge-based system, wherein the ten elements of the causal model comprise CoS (Change of State), PPH (Physical Phenomena), PEF (Physical Effects), Input, EPH (Ecological Phenomena), EBH (Ecological Behavior), Organ, Part, Entity, and Action.

4. The diagram-based ideation platform apparatus of claim 1, wherein the associated card search computing unit is configured for:

searching for the past cases through the similarity assessment, analyzing a relation index for the past case selected by the user through contextual search, and updating an influence of the relation index.

5. A diagram-based ideation method being performed on a diagram-based ideation platform apparatus for searching biomimetics information, the method comprising:

executing a concept-knowledge (C-K) canvas divided into a concept space which contains concept data and a knowledge space which contains knowledge data including the biomimetics information;

converting the concept data and the knowledge data into respective concept cards and knowledge cards, performing a chaining process which connects the concept data with the knowledge data to be searched for the concept data, registering a concept card in the concept space when a user input is received on the C-K canvas;

searching for an associated card through interworking with a knowledge-based system when a search request related to the concept card is input, wherein the interworking comprises visualizing on the C-K canvas interconnections connecting the concept data in the concept space to knowledge data in the knowledge space containing the biomimetics information, wherein the concept data and the knowledge data with the interconnections are diagrammatically expressed, visualized to the user, and recorded over time for reuse;

listing searched related cards and placing selected associated cards in the concept space and the knowledge space according to attributes; and connecting and visualizing a link between the concept card and the associated card, wherein the searching for the associated card includes performing a similarity assessment by comparing a first entity value of entities of the knowledge-based system with a second entity value of other entities of the C-K canvas and generating indices representative of the similarity assessment;

mapping connections of new entities to be added to the C-K canvas from causalities between existing entities of the knowledge-based system;

determining a placement priority of the associated cards on the C-K canvas based on a highest order of the indices determined in the similarity assessment;

updating weight factors for relationships selected by the user and using the updated weight factors in the similarity assessment; and searching for, in the knowledge-based system, a case having a high similarity as a result of the similarity assessment among past cases through reuse of the past cases based on a search query reconstructed from the concept card, and extracting and recommending which of the concept data and the knowledge data to be recommended as the associated card based on the causal relationship described in the searched case.

6. The diagram-based ideation method of claim 5, wherein the searching for the associated card, the placing the selected associated cards, and the connecting the link are repeatedly performed, and wherein the C-K canvas is stored and managed as one case when the iteration is completed.

* * * * *